United States Patent
Hashimoto et al.

(10) Patent No.: US 7,955,685 B2
(45) Date of Patent: Jun. 7, 2011

(54) CELLULOSE ACYLATE FILM AND METHOD FOR PRODUCING SAME

(75) Inventors: Kiyokazu Hashimoto, Minami-ashigara (JP); Masaaki Otoshi, Fujinomiya (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1039 days.

(21) Appl. No.: 11/014,970

(22) Filed: Dec. 20, 2004

(65) Prior Publication Data

US 2005/0150426 A1    Jul. 14, 2005

(30) Foreign Application Priority Data

Dec. 19, 2003   (JP) .................................. 2003-423050

(51) Int. Cl.
*C08L 1/10* (2006.01)
(52) U.S. Cl. ..................................... 428/141; 106/170.21
(58) Field of Classification Search .................. 428/141; 106/170.21
See application file for complete search history.

(56) References Cited

U.S. PATENT DOCUMENTS

| | | | | |
|---|---|---|---|---|
| 6,710,923 B2 * | 3/2004 | Ito | ................................ | 359/599 |
| 2003/0164115 A1 * | 9/2003 | Mukunoki et al. | ....... | 106/170.47 |

FOREIGN PATENT DOCUMENTS

| | | | |
|---|---|---|---|
| JP | 2000-352620 A | | 12/2000 |
| JP | 2002-212312 A | | 7/2002 |
| WO | WO 02/101447 A1 | * | 12/2002 |

OTHER PUBLICATIONS

Patent Abstracts of Japan, Publication No. 2000-352620, Dec. 19, 2000.

* cited by examiner

*Primary Examiner* — Alicia Chevalier
(74) *Attorney, Agent, or Firm* — Buchanan Ingersoll & Rooney PC

(57) ABSTRACT

Disclosed is a cellulose acylate film produced according to a melt casting process and having an Re unevenness of from 0 to 10%. When built in a liquid-crystal display device, the film significantly solves the problem of display unevenness and humidity-dependent visibility change.

10 Claims, No Drawings

CELLULOSE ACYLATE FILM AND METHOD FOR PRODUCING SAME

BACKGROUND OF THE INVENTION

1. Field of the Invention

The present invention relates to unstretched and stretched cellulose acylate films produced according to a melt casting process, which are usable as optical films. The invention also relates to a method for producing the films.

2. Description of the Related Art

Cellulose acylate films heretofore used for substrates for liquid-crystal image display devices are produced by dissolving a cellulose acylate in a chlorine-containing organic solvent such as dichloromethane to prepare a dope, then casting the dope through a casting die onto a casting support, and drying it to form a film thereon. Dichloromethane has a low boiling point (about 40° C.) and its advantage is that it readily evaporates. Accordingly, heretofore, dichloromethane is favorably used as a chlorine-containing organic solvent for cellulose acylate films.

Anyone is obliged to handle the low-boiling-point, chlorine-containing organic solvent such as dichloromethane in a closed system, from the viewpoint of current environmental protection. For example, a method is employed which comprises preventing the leakage of such a chlorine-containing organic solvent in a perfect closed system, and, even if leaked out, the chlorine-containing organic solvent is adsorbed by an adsorbent in a gas-absorption column and treated therein before it goes out into external air. Further, before discharged out into external air, the chlorine-containing organic solvent is fired or decomposed with electron beams, and then the thus-decomposed solvent is discharged out. This is another method heretofore employed in the art. However, it is difficult to completely prevent the discharge of chlorine-containing organic solvents, and further studies are needed.

For preventing chlorine-containing organic solvents from being discharged out into external air, heretofore known is a method of producing cellulose acylate films not using a chlorine-containing organic solvent (JP-A-2000-352620, claim 7, paragraphs [0016], [0039] to [0040]. In this film-forming method, the carbon chain of the ester group of the cellulose acylate is prolonged and the melting point of the polymer is thereby lowered so that the polymer may be readily formed into films in a mode of melt casting. More concretely, cellulose propionate, cellulose butylate or the like is used in place of cellulose acetate so as to facilitate the melt-casting film formation.

However, when a polarizer is formed of the cellulose acylate film produced according to the method as above and when this is built in a liquid-crystal display device and used therein, then it has a drawback in that uneven display, especially remarkable uneven display occurs in the machine direction of the film. The display unevenness is especially remarkable when the film is built in a large-size liquid crystal display panel of 15 inches or more, and it is a serious problem for large-size displays and therefore requires further improvements. In addition, the cellulose acylate film produced according to the above-mentioned method has another problem in that its visual field may often vary depending on the ambient humidity change, and the film therefore requires further improvements.

The present invention has been made in consideration of the above-mentioned problems, and its object is to provide unstretched and stretched cellulose acylate films which, when built in liquid-crystal display devices, significantly relieve or solve the problems of display unevenness and humidity-dependent visibility change, and also to provide a method for producing the films.

SUMMARY OF THE INVENTION

We, the present inventors, have assiduously studied the cause of display unevenness in large-size liquid-crystal display panels formed of cellulose acylate films. As a result, we have found that the principal cause of the display unevenness in such panels is the unevenness of the cellulose acylate films produced according to a melt casting process. We have found out a method for improving the films, and have completed the present invention.

Specifically, the object of the invention can be attained by a stretched or unstretched cellulose acylate film which is produced according to a melt casting process and which satisfies a least one of the following conditions (1) to (4):

(1) its Re unevenness is from 0 to 10%,
(2) its Rth unevenness is from 0 to 10%,
(3) its thickness unevenness is from 0 to 2%,
(4) its humidity-dependent Re change and humidity-dependent Rth change are from 0 to 1.5%/% RH.

Preferably, the acylate group in the cellulose acylate film of the invention satisfies all the following conditions:

$2.6 \leq X \leq X+Y \leq 3.0$,
$0 \leq X \leq 1.8$,
$1.0 \leq Y \leq 3.0$, wherein X indicates the degree of substitution with an acetate group; Y indicates the sum total of the degree of substitution with a propionate group, a butyrate group, a pentanoate group and a hexanoate group.

The invention also provides a method for producing a cellulose acylate film, which comprises melting a cellulose acylate by the use of a screw having a compression ratio of from 3 to 15, at a temperature falling between 180 and 250° C., and then casting it through a T-die onto a casting drum.

The invention further provides a method for producing a cellulose acylate film, which comprises forming a cellulose acylate film on a casting drum, then peeling the film from the casting drum, winding the film around a nip roll to remove its tension, and then winding the film around a roll under a tension of from 0 to 10 kg/cm².

The invention still further provides a method for producing a cellulose acylate film, which comprises forming a molten film of a cellulose acylate on a casting drum, then solidifying the film on the casting drum by cooling it thereon within a range falling between (Tg of cellulose acylate+30° C.) and (Tg of cellulose acylate) at a cooling rate of from 10 to 100° C./sec.

The invention also provides a polarizer comprising at least one layer of the cellulose acylate film laminated on a polarizing layer. The invention also provides an optically-compensatory film and an anti reflection film for liquid-crystal display panels, which comprises the cellulose acylate film as the substrate thereof.

The invention is an unstretched or stretched cellulose acylate film obtained through melt-casting film formation, and its Re unevenness, Rth unevenness, thickness unevenness, as well as its humidity-dependent Re change and humidity-dependent Rth change are all controlled to fall within a predetermined range. When built in liquid-crystal display devices, the cellulose acylate film of the invention remarkably solves the display unevenness and the humidity-dependent visibility change of the devices, and therefore it is the most suitable for the substrate for large-size liquid-crystal display devices.

BEST MODE FOR CARRYING OUT THE INVENTION

The cellulose acylate film of the invention is described in detail hereinunder.

In this description, the numerical range expressed by the wording "a number to another number" means the range that falls between the former number indicating the lowermost limit of the range and the latter number indicating the uppermost limit thereof.

The cellulose acylate film of the invention is grouped into an unstretched cellulose acylate film (hereinafter referred to as "unstretched film") and a stretched cellulose acylate film (hereinafter referred to as "stretched film"). The unstretched film and the stretched film are separately described hereinunder.

[Unstretched Film]

The unstretched film of the invention is profiled in that its Re unevenness is from 0 to 10%, its Rth unevenness is from 0 to 10%, its thickness unevenness is from 0 to 2% and/or its humidity-dependent Re change and its humidity-dependent Rth change fall between 0 and 1.5%/% RH. Specifically, the unstretched film of the invention is so controlled that its optical unevenness and thickness unevenness are reduced as much as possible by uniformly producing it.

<Re Unevenness>

The in-plane residual retardation Re is a product obtained by multiplying the difference between the refractivity in the machine direction (MD) in the plane of the film and that in the transverse direction (TD) therein, by the thickness of the film. Preferably, Re is from 0 to 100 nm, more preferably from 0 to 50 nm, even more preferably from 0 to 25 nm. The Re unevenness is suitably from 0 to 10%, but preferably from 0 to 7%, more preferably from 0 to 5%.

For controlling the Re unevenness to fall within the range as above, it is desirable that, after the cooled and solidified film has been peeled off from a casting drum, it is wound up around a nip roll to remove its tension, and then it is further wound up around a roll under a tension of from 0 to 10 kg/cm$^2$, preferably from 0.1 to 9 kg/cm$^2$, more preferably from 0.5 to 7 kg/cm$^2$.

Just after peeled from the casting drum, the film is at around the glass transition temperature (hereinafter referred to as "Tg") of cellulose acylate. Accordingly, the film is stretched owing to the winding tension, and has Re and Rth. These Re and Rth are especially remarkable at the edges of the film rather than in the center part of the film. As a result, the film shall have parabolic fringes (that is, Re and Rth unevenness).

For preventing the above-mentioned Re and Rth unevenness, a method is known in which a nip roll is disposed after the casting drum so as to remove the winding tension from the cast film. According to the method, however, the winding tension could not be completely removed, and slight tension may still remain and propagate to the film peeled from the casting drum. This may cause Re and Rth unevenness. Since the unevenness occurs throughout the entire region in the transverse direction of the film, it could not be detected in small-size samples of the film but would present a problem when the film is cut into large-size pieces. Accordingly, in the invention, the film is wound up around a roll under a weak tension of from 0 to 10 kg/cm$^2$, and the occurrence of the above-mentioned Re and Rth unevenness is reduced as much as possible (however, conventional cellulose acylate films are generally wound up under a tension of 20 kg/cm$^2$ or more).

When the film is wound up around a roll under such a weak tension, then the rolled film may be shifted and deformed from its original condition, but this problem may be solved by knurling the two edges of the film.

<Rth Unevenness>

The residual retardation in the thickness direction of the film, Rth, is a product obtained by multiplying the in-plane refractivity (average in the machine direction (MD) and in the transverse direction (TD)) by the refractivity in the thickness direction of the film. Rth is preferably from 0 to 100 nm, more preferably from 0 to 50 nm, even more preferably from 0 to 25 nm. Preferably, the Rth unevenness is from 0 to 10%, more preferably from 0 to 7%, even more preferably from 0 to 5%.

For controlling the Rth unevenness to fall within the range as above, it is desirable that the time within which the molten film (hereinafter referred to as "melt") extruded out through a casting die (T-die) is cooled and solidified on a casting drum is prolonged as much as possible. The melt extruded out through a casting die at a temperature not lower than its Tg is cooled on the casting drum and shrunk thereon at a temperature not higher than its Tg. The shrinkage of the melt in the in-plane direction is suppressed by the friction between the melt and the casting drum, and the shrinkage thereof in the thickness direction may be therefore predominant. In such a case, plane orientation is formed and Rth occurs. Accordingly, when the shrinkage in the thickness direction is too rapid, then Rth unevenness may often occur. Therefore, in the invention, the cooling of the melt on the casting drum is effected gradually.

Preferably, the melt on the casting drum is cooled and solidified at a solidifying speed of from 10 to 100° C./sec within a temperature range falling between (Tg+30° C.) and Tg. More preferably, the solidifying speed is from 15 to 80° C./sec, more preferably from 20 to 60° C./sec. This solidifying speed is much lower than the solidifying speed of at least 300° C./sec in conventional technology.

For controlling the solidifying speed to fall within the range of from 10 to 100° C./sec, it is desirable to control the difference between the temperature of the casting drum and the temperature of the casting die (temperature controlling). Preferably, the temperature difference between the casting drum and the casting die falls between (Tg−30° C.) and (Tg+50° C.) more preferably between (Tg−20° C.) and (Tg+40° C.), even more preferably between (Tg−10° C.) and (Tg+30° C.)<

<Humidity-Dependent Re and Rth Change>

It is considered that one reason for the display unevenness in the liquid-crystal display panel that comprises the unstretched film of the invention built thereinto would be the occurrence of Re and Rth depending on the ambient humidity. In the liquid-crystal display panel, the temperature of the film is elevated owing to the light source disposed as the back of the panel, and the water content of the cellulose acylate used for the polarizer or the like changes. Further, with the increase in the film temperature, the cellulose acylate in the cellulose acylate film may adsorb water and the free volume between the cellulose acylate molecules may therefore vary and, as a result, it is presumed that the mobility of the acylate group may change and the acylate group itself may also change. The water content change in the cellulose acylate and the mobility change of the acylate group will promote the occurrence of Re and Rth and, as a result, there may occur Re and Rth unevenness. In that manner, Re and Re significantly depends on the ambient humidity, and Re and Rth fluctuation occurs in accordance with the ambient humidity change.

The humidity-dependent Re change and the humidity-dependent Rth change are both suitably from 0 to 1.5%/% RH, but preferably from 0 to 1.2%/% RH, more preferably from 0 to 1%/% RH. When the humidity-dependent Re change and the humidity-dependent Rth change both fall within a range of from 0 to 1.5%/% RH, then the occurrence of Re and Rth unevenness may be reduced in liquid-crystal display panels that comprise the cellulose acylate film of the invention built therein, even in high-temperature high-humidity environments.

For reducing the humidity-dependent Re and Rth change, it is effective to reduce the free volume of the film. For reducing the free volume of the film, it is effective that the melt extruded out through a casting die is gradually cooled at a temperature not higher than Tg. The preferred cooling speed is from −0.1° C./sec to −20° C./sec, more preferably from −0.5° C./sec to −15° C./sec, even more preferably from −1° C./sec to −10° C./sec, within a range between (Tg−20° C.) and Tg.

The above-mentioned cooling (gradual cooling) may be attained by disposing multiple casting drums and gradually cooling the film on these drums (at −0.1 to −20° C./sec). (Contrary to this, in conventional technology, the film is solidified on one casting drum and the film is peeled off from the drum and then rapidly cooled in air. In this, therefore, the cooling speed is at least 50° C./sec). Preferably, the number of the casting drums is from 2 to 10, more preferably from 2 to 6, even more preferably from 3 to 5. The temperature of the casting drum may be the same or different. More preferably, the temperature of the most upstream casting drum is lower than that of the most downstream casting drum. When three or more casting drums are disposed, then the temperature of the middle casting drum may be higher or lower than the temperature of the casting drums before and after it. Specifically, so far as the temperature of the most upstream or the most downstream casting drum is kept low, then the temperature of the casting drums between them may be any desired one. The diameter of the casting drum is suitably from 20 to 200 cm, but preferably from 30 to 150 cm, more preferably from 35 to 100 cm.

For controlling the humidity-dependent Re change and the humidity-dependent Rth change to fall within a range of from 0 to 1.5%/% RH, the film-forming speed is preferably from 15 to 300 m/sec, more preferably from 20 to 200 m/sec, even more preferably from 30 to 100 m/sec.

<Thickness Unevenness>

A melt-casting film formation method comprises extruding a melt from a melt kneader through a casting die (slit) thereof onto a casting drum, and cooling and solidifying it to form a film thereon. The die streaks from the casting die cause the thickness unevenness in the transverse direction (TD), and may further cause the thickness unevenness in the machine direction (MD) (cross streaks) depending on the condition of film adhesion to the casting drum.

The thickness unevenness of the unstretched film of the invention is suitably from 0 to 2% both in the machine direction (MD) and in the transverse direction (TD), but preferably from 0 to 1.5%, more preferably from 0 to 1%. When the thickness unevenness of the film is controlled to fall within a range of from 0 to 2%, then the film may be free from a problem of display unevenness when built in display panels.

In the invention, for removing the above-mentioned die streaks, the melt temperature is controlled to fall between 180 and 250° C., preferably between 190 and 240° C., more preferably between 200 and 230° C. ordinary resin has a high melt temperature of 260° C. or higher. However, in the invention, the melt temperature of the resin is controlled to fall between 180 and 250° C., whereby the cellulose acylate is prevented from being decomposed. Accordingly, the decomposed product of the cellulose acylate that may remain in the die may be reduced and therefore the thickness unevenness of the film that is caused by the die lines formed by the decomposed product may be reduced.

However, when the melt temperature its lowered as in the above, then some melt failure may occur and it may form fish eyes in the film. In the invention, in order to prevent such melt failure at low temperatures, a screw having a high compression ratio is used. The compression ratio is generally less than 3. In the invention, however, the compression ratio is preferably from 3 to 15, more preferably from 4 to 12, even more preferably from 5 to 10.

In the invention, it is also desirable that the temperature of the casting die (T-die) is kept lower by from 5 to 30° C. from the melt temperature. This is in order to prevent the cellulose acylate having remained in the casting die from being decomposed and scorched to give die lines. In an ordinary film formation method, in general, the temperature in the course from the melt kneader to the casting die (T-die) is kept the same or is increased so as to lower the melt viscosity of the resin melt whereby the die lines once formed are leveled. However, when a cellulose acylate that is readily pyrolyzed is formed into a film in a mode of casting film formation, then it is effective that the casting die temperature is kept lower by from 5 to 30° C. than the melt temperature.

Preferably, the water content of the cellulose acylate before it is melted is controlled to fall between 0 and 0.5%, more preferably between 0 and 0.4%, even more preferably between 0 and 0.3%. Accordingly, hydrolysis of the cellulose acylate during melting as well as impurities from the hydrolysis may be prevented. The water content of the cellulose acylate may be controlled in the desired manner by drying it at a temperature falling between 80 and 180° C. for 0.1 to 100 hours. The drying may be effected in air, in an inert gas (e.g., nitrogen) atmosphere or in vacuum.

On the other hand, for solving the thickness unevenness in the machine direction (MD) (cross streaks), in the invention, it is desirable that the distance between the casting die (T-die) and the casting drum is controlled to be from 5 to 50 cm, more preferably from 6 to 40 cm, even more preferably from 7 to 35 cm. For preventing neck-in, in general, the distance between the casting die (T-die) and the casting drum is kept as near as possible, and it is generally from 0 to 3 cm. In the invention, since thy cellulose acylate film formed is hardly necked in, it is desirable that the distance between the casting drum and the casting die (T-die) is as broad as possible as in the above. Accordingly, the temperature of the melt that is brought into contact with the casting drum may be lowered, and the temperature difference between the extruded film and the casting drum may be reduced.

If the temperature difference between the melt film and the casting drum is large, then the molten film (melt) may rapidly shrink on the casting drum and, as a result, the film may wrinkle and cause the formation of cross streaks on its surface. To prevent the formation of such cross streaks, it is desirable that the temperature of the casting drum falls between (Tg−30° C.) and Tg, more preferably between (Tg−20° C.) and (Tg−1° C.) even more preferably between (Tg−15° C.) and (Tg−2° C.). Prolonging the distance between the casting die (T-die) and the casting drum is also effective for leveling and reducing the de streaks.

Though not specifically defined, the thickness of the unstretched film of the invention is preferably from 10 to 400 μm, more preferably from 20 to 300 μm, even more preferably from 30 to 200 μm. When the thickness of the unstretched film is at least 10 μm, then the film may have suitable mechanical strength and would not be broken while handled. On the other hand, when the thickness of the unstretched film is at most 400 μm, then the film could be readily folded and could be handed with ease.

[Stretched Film]

The stretched film of the invention is described hereinunder.

The stretched film of the invention can be produced by uniformly stretching the above-mentioned unstretched film of which the thickness unevenness and the optical unevenness (Re unevenness and Rth unevenness) are all small, in such a controlled manner that the thickness and the retardation of the stretched film are kept uniform. As opposed to this, in the conventional film formation method described in JP-A-2000-352620, a film having some thickness unevenness is stretched, and therefore its thin and mechanically-weak part is first stretched and the thickness unevenness may be augmented in the stretched film.

Preferably, Re and Rth of the stretched film of the invention fall between 20 and 1000 nm, more preferably between 25 and 500 nm, even more preferably between 25 and 200 nm. The Re unevenness of the stretched film of the invention is suitably from 0 to 10%, but preferably from 0 to 7%, more preferably from 0 to 5%. The Rth unevenness of the stretched film is suitably from 0 to 10%, but preferably from 0 to 7%, more preferably from 0 to 5%. The thickness unevenness of the stretched film is suitably from 0 to 2% both in the machine direction (MD) and in the transverse direction (TD), but preferably from 0 to 1.5%, more preferably from 0 to 1%. The humidity-dependent Re and Rth change of the stretched film is suitably from 0 to 1.5%/% RH, but preferably from 0 to 1.2%/% RH, more preferably from 0 to 1%/% RH.

The stretched film of the invention is obtained by stretching the unstretched film having the properties as above. Specifically, stretching the unstretched film (starting film) of which the Re unevenness is small gives the stretched film of which the Re unevenness, the Rth unevenness, the thickness unevenness, as well as the humidity-dependent Re and Rth change are all small. The stretching condition will be described in detail hereinunder.

Preferably, the thickness of the stretched film of the invention is from 10 to 300 μm, more preferably from 20 to 200 μm, even more preferably from 30 to 100 μm. When the thickness of the stretched film is at least 10 μm, then it may have suitable mechanical strength and may not break while handled. On the other hand, when the thickness of the stretched film is at most 400 μm, then the film may be readily folded and is handled with ease.

[Other Physical Properties of Cellulose Acylate Film]

Preferably, the cellulose acylate film of the invention is as follows: At 105° C. and for 5 hours, the dimensional shrinkage in the machine direction and in the transverse direction of the film is preferably at most ±0.1%, more preferably at most ±0.08%. At 80° C. and 90% RH, the dimensional shrinkage of the film in the machine direction and in the transverse direction is preferably less than 0.5%, more preferably less than ±0.4%. The haze of the film is preferably at most 0.6%, more preferably at most 0.4%. The tear strength of the film in the machine direction and in the transverse direction is preferably at least 10 gf, more preferably at least 15 gf. Also preferably, the tensile strength of the film in the machine direction and in the transverse direction is at least 50 N/mm$^2$, more preferably at least 70 N/mm$^2$. The modulus of elasticity of the film in the machine direction and in the transverse direction is preferably at least 3 kN/mm$^2$, more preferably at least 4 kN/mm$^2$.

The cellulose acylate film of the invention may be used alone, or may be combined with a polarizer. If desired, a liquid-crystal layer or a refractivity-controlled layer (low-refractivity layer) or a hard coat layer may be provided on these.

[Method of Producing Cellulose Acylate Film]

A method for producing the cellulose acylate film of the invention is described below.

<Cellulose Acylate>

The cellulose acylate for use in the invention is a lower fatty acid ester of cellulose. The lower fatty acid as referred to herein means a fatty acid having at most 6 carbon atoms. The lower fatty acid ester (acylate group) includes, for example, those esterified with an acetate group, a propionate group, a butyrate group, a pentanoate group, or a hexanoate group of the esters, preferred are those esterified with an acetate group, a propionate group, a butyrate group or a pentanoate group; more preferred are those esterified with an acetate group, a propionate group or a butyrate group. The lower fatty acid ester of cellulose that contains any of these groups may comprise a single type fatty acid or a combination of different types of fatty acids.

Preferably, the acylate group in the cellulose acylate for use in the invention satisfies the following conditions:

$2.6 \leq X+Y \leq 3.0$,
$0 \leq X \leq 1.8$,
$1.0 \leq Y \leq 3$, wherein X indicates the degree of substitution with an acetate group; Y indicates the sum total of the degree of substitution with a propionate group, a butyrate group, a pentanoate group, a pentanoate group and a hexanoate group.

More preferably, the acylate group satisfies the following conditions:

$2.6 \leq X+Y \leq 3.0$,
$0 \leq X \leq 1.4$,
$1.3 \leq Y \leq 3$.

Even more preferably, the acylate group satisfies the following conditions:

$2.7 \leq X+Y \leq 3.0$,
$0 \leq X > 1$,
$1.5 \leq Y \leq 3$.

When the degree of substitution with an acetate group (X) is lowered and when the sum total of the degree of substitution with a propionate group, a butyrate group, a pentanoate group and a hexanoate group (Y) is increased, then the humidity-dependent Re and Rth change of the film may be controlled. Though its details are unclear as yet, it may be presumed that the propionate group and others may be oriented and may contribute toward the retardation expression in the film. Specifically, it may be considered that, with moisture absorption or desorption of the film, the propionate group and others may move and the orientation may be thereby changed and the retardation may also fluctuate. The propionate group and others that are larger than an acetyl group is introduced into the cellulose acylate film as the acylate group thereof, and it may be presumed that the movement of such large groups may be suppressed, and, as a result, the humidity-dependent retardation change of the film may be thereby reduced.

The basic principle for production of cellulose acylate is described in Migita et al., *Wood Chemistry*, pp. 180-190 (by Kyoritsu Publishing, 1968). One typical production method is a liquid-phase acetylation method with carboxylic acid anhydride-acetic acid-sulfuric acid catalyst. Concretely, a cellulose material such as cotton liner or wood pulp is pretreated with a suitable amount of acetic acid, and then esterified by putting it into a previously-cooled, carboxylic acid mixture to give a complete cellulose acylate (the total of the degree of acyl substitution at 2-, 3- and 6-positions is almost 3.00). The carboxylic acid mixture generally contains acetic acid serving as a solvent, a carboxylic acid anhydride serving as an esterifying agent, and sulfuric aced serving as a catalyst. In this, in general, the amount of the carboxylic acid anhydride is stoichiometrically excessive over the total of the water content of the cellulose to be reacted with it and the water content in the system.

After the acylation, an aqueous solution that contains a neutralizing agent is added to the system so as to hydrolyze the excessive carboxylic acid anhydride still remaining in the system and to partially neutralize the esterification catalyst. The neutralizing agent includes, for example, carbonates, acetates or oxides of calcium, magnesium, iron, aluminium or zinc. Next, the complete cellulose acylate is saponified and ripened by keeping it at 50 to 90° C. in the presence of a small amount of an acetylation catalyst (generally this is sulfuric acid remaining in the system), whereby this is conversed into a cellulose acylate having a desired degree of acyl substitution and a desired degree of polymerization. When the desired cellulose acylate is obtained, the catalyst still remaining in the system is completely neutralized with a neutralizing agent such as that mentioned above, or without the neutralization treatment, the cellulose acylate solution is put into water or into a diluted sulfuric acid (or water or a diluted sulfuric acid is put into the cellulose acylate solution) to thereby separate the cellulose acylate, and the thus-separated cellulose acylate is washed and stabilized. In that manner, the intended cellulose acylate is obtained.

Preferably, the degree of polymerization of the cellulose acylate for use in the invention is from 200 to 700, in terms of the viscosity-average degree of polymerization hereof, more preferably from 250 to 550, even more preferably from 250 to 400, most preferably from 250 to 350. The viscosity-average degree of polymerization may be determined according to an Uda et al's limiting viscosity number method (Kazuo Uda, Hideo Saito, *Journal of the Fiber Society*, Vol. 18, No. 1, pp. 105-120, 1962). In additions the viscosity-average degree of polymerization is described in detail in JP-A-9-95538.

The viscosity-average degree of polymerization of the cellulose acylate for use in the invention may be controlled by removing the low-molecular-weight component from it. When the low-molecular-weight component is removed from it, then the resulting cellulose acylate may have an increased mean molecular weight (degree of polymerization), but its viscosity is lower than ordinary cellulose acylate and therefore it is still useful. Removing the low-molecular-weight component may be attained by washing the cellulose acylate with a suitable organic solvent. In addition, according to the polymerization method employed for it, the molecular weight of the cellulose acylate may also be controlled. For example, when a cellulose acylate having a smaller content of a low-molecular-weight component is produced, then it is desirable that the amount of the sulfuric acid catalyst in the acetylation is controlled to fall between 0.5 and 25 parts by mass relative to 100 parts by mass of cellulose. When the amount of the sulfuric acid catalyst is controlled to fall within the range as above, then a cellulose acylate that is preferable in point of the molecular weight distribution profile thereof (that is, having a uniform molecular weight distribution profile) can be produced.

The ratio of the weight-average molecular weight (Mw)/number-average molecular weight (Mn) of the cellulose acylate for use in the invention may fall between 1.5 and 5.5, preferably between 2.0 and 5.0, more preferably between 2.5 and 5.0, even more preferably between 3.0 and 5.0.

Preferably, Tg of the cellulose acylate for use in the invention is from 70 to 180° C., more preferably from 30 to 160° C., even more preferably from 90 to 150° C.

One or more different types of cellulose acylates may be used in the invention either singly or as combined. If desired, any other polymer component than cellulose esters may be mixed with the cellulose acylate for use in the invention. The additional polymer component is preferably well compatible with cellulose esters. Concretely, it is desirable that the transmittance of the films formed of the mixture is at least 80%, more preferably at least 90%, even more preferably at least 92%.

Preferably, in the invention, the cellulose acylate is used as pellets thereof from the viewpoint of reducing the thickness unevenness (extrusion unevenness) in melt formation. Preferably, the size of the pellets is from 0.001 to 1 cm$^3$, more preferably from 0.01 to 0.5 cm$^3$, even more preferably from 0.02 to 0.3 cm$^3$. The cellulose acylate pellets are dried under the condition as above.

<Additives>

The cellulose acylate film of the invention may contain various additives (e.g., plasticizer, UV absorbent, IR absorbent, fine particles, antideterioration agent, optical anisotropy improver).

As the plasticizer, for example, herein usable are those described in JP-A-2000-352620. Preferably, the concentration of the plasticizer to be in the film is from 0.1 to 25% by mass of the cellulose acylate that constitutes the film. As the IR absorbent, for example, herein usable are those described in JP-A-2001-194522. As the UV absorbent, for example, those described in JP-A-2001-151901 are usable. Preferably, the concentration of the IR absorbent and the UV absorbent is from 0.001 to 5% by mass of the cellulose acylate. The fine particles for use herein may be formed of a metal oxide or a crosslinked polymer. Preferably, they have a mean particle size of from 5 to 3000 nm. Also preferably, the concentration of the fine particles is from 0.001 to 5% by mass of the cellulose acylate. Preferably, the concentration of the antideterioration agent to be in the film is from 0.0001 to 2% by mss of the cellulose acylate. For the optical anisotropy improve, for example, herein usable are those described in JP-A-2003-66230 and 2002-49128. Preferably, the concentration of the optical anisotropy improver is from 0.1 to 15% by mass of the cellulose acylate.

The condition in forming the cellulose acylate film of the invention is described below.

<Melt Film Formation>

(a) Preheating:

After dried, a cellulose acylate is directly put into the hopper of a melt extruder. In this state, the hopper is kept at a temperature falling between (Tg−50° C.) and (Tg+30° C.) preferably between (Tg−40° C.) and (Tg+10° C.), more preferably between (Tg−30° C.) and Tg. In that condition, water is prevented from being re-adsorbed by the polymer in the hopper and the drying efficiency may be therefore higher.

(b) Kneading Extrusion:

Using a screw having the above-mentioned compression ratio (falling between 3 and 15), the cellulose acylate is kneaded at the above-mentioned melting temperature (falling between 180 and 250° C.). In this stage, the melting temperature may be kept constant all the time, or may be varied to have a controlled temperature profile that varies in some sections. More preferably, the temperature on the upstream side (hopper side) is kept higher than that on the downstream side (T-die side) by from 1 to 50° C., preferably by from 2 to 30° C., more preferably by from 3 to 20° C., since the cellulose acylate may be more effectively prevented from being decomposed in that condition. Specifically, for promoting the melting operation, the temperature of the upstream side that governs the melt is kept higher; and after the melting operation, the temperature is kept lower so as to prevent the melt from being decomposed. Preferably, the time for the melting operation is from 2 to 60 minutes, more preferably from 3 to 40 minutes, even more preferably from 4 to 30 minutes. Further, it is also desirable that the inner atmosphere of the melt extruder is an inner gas (e.g., nitrogen) atmosphere.

(c) Casting:

The molten resin is led into a gear pump, in which the pulsation of the extruder is removed from it, and then this is filtered through a metal mesh filter or the like. Then, this is led through the casting die (T-die) fitted after the extruder, onto a chill drum to from thereon a sheet of melt film. In this stage, it is desirable that the resin melt is extruded out through the casting dye (T-die) of which the temperature is controlled to be lower than the resin-melting temperature as so mentioned hereinabove.

When the melt extruder has a melting temperature profile that varies in some divided portions therein, then the temperature in the extruder is based on the melting temperature at the site thereof nearest to the casting die (T-die). After this, the distance between the casting die (T-die) and the casting drum is kept as in the above (5 to 50 cm). In this stage, the casting operation is preferably effected in a casing so as to reduce the temperature fluctuation during the operation. The extrusion may be for single layer formation or may be for multi-layer formation by the use of a multi-manifold die or a field-block die.

Next, this is extruded out onto a casting drum such as that mentioned hereinabove. The diameter of the drum may be from 20 to 200 cm; the number of the drums may be from 2 to 10; and the temperature of the drum may be from (Tg−30° C.) to Tg. In this stage, it is desirable to use any of an electrostatic charging method, an air knife method, an air chamber method, a vacuum nozzle method or a touch roll method so as to increase the adhesiveness between the casting drum and the melt-extruded sheet. The adhesion improving method may be employed entirely or partly in the melt-extruded sheet.

After the melt is cooled on the casting drum under the condition mentioned above (temperature: Tg to (Tg−20° C.), cooling rate: −0.1 to −20° C./sec), and this is peeled off from the casting drum, then led to a nip roll, and wound up around a roll under the above-mentioned tension (0 to 10 kg/cm$^2$). Preferably, the winding speed is from 10 to 100 m/min, more preferably from 15 to 80 m/min, even more preferably from 20 to 70 m/min.

Though not specifically defined, the width of the film to be formed is preferably from 1.5 to 5 m, more preferably from 1.6 to 4 m, even more preferably from 1.7 to 3 m. The thickness of the thus-obtained unstretched film is preferably from 30 to 400 µm, more preferably from 40 to 200 µm, even more preferably from 50 to 150 µm. Also preferably, Re and Rth of the film is from 0 to 100 nm, more preferably from 0 to 50 nm, even more preferably from 0 to 25 nm.

Preferably, the thus-obtained film is trimmed at both edges thereof and then wound up. The trimmed scraps may be ground, then optionally granulated and depolymerized/repolymerized, and recycled as the starting material for the same type or different type of films. Before wound up, it is also desirable that the film is laminated with an additional film on at least one surface thereof for preventing it from being scratched and damaged.

<Stretching>

When a stretched film is obtained from the unstretched film, it is desirable that the unstretched film is stretched at a temperature falling between Tg and (Tg+50° C.), more preferably between (Tg+1° C.) and (Tg+30° C.), even more preferably between (Tg+2° C.) and (Tg+20° C.). Also preferably, the draw ratio for the stretching is from 1 to 500%, more preferably from 3 to 400%, even more preferably from 5 to 300% in both the machine direction (MD) and the transverse direction (TD). The stretching may be effected in one stage or in multiple stages. The draw ratio may be obtained according to the following formula:

Draw Ratio (%)=100×{(length after stretching)−(length before stretching)}/(length before stretching).

The stretching may be effected by the use of at least two pairs of nip rolls of which the speed of the roll on the take-out side is kept higher, in the machine direction (MD stretching); or may be effected by holding both edges of the film with a chuck and expanding the thus-held film in the direction perpendicular to the machined direction (TD stretching). In any case, in general, Re and Rth may increase when the draw ratio in stretching is large.

In MD stretching, when the value obtained by dividing the nip roll-to-nip roll distance by the film width (aspect ratio) is small, then the ratio of Rth/Re may increase. On the other hand, in TD stretching, when the film is MD-stretched or MD-relaxed simultaneously with the TD-stretching, then the ratio of Rth/Re may be thereby controlled. Concretely, in the TD stretching, when the film is MD-stretched simultaneously, then the ratio Rth/Re may increase; but when the film is MD-relaxed simultaneously with the TD stretching, then the ratio Rth/Re may decrease.

Preferably, the stretching rate is from 10 to 10000%/min, more preferably from 20 to 10000%/min, even more preferably from 30 to 800%/min.

In order to further reduce the Re unevenness, the Rth unevenness and the thickness unevenness, it is desirable that the stretching temperature is varied in the width direction of the film in addition to using flat films (unstretched films of the invention). Specifically, in MD stretching and in TD stretching, both edges of the films are stretched to a higher degree to thereby cause the occurrence of Re and Rth. For solving this problem, it is desirable to make the temperature at the edges higher than that in the center part of the film. The edges as referred to herein indicate a region of 10% of the entire width of the film. The temperature at the edges are made higher than that in the center part of the film by from 6 to 40%, preferably by from 7 to 30° C., more preferably by from 8 to 25° C. For elevating the temperature at both edges of the film, a heat source (e.g., panel heater, IR heater) may be disposed at around both edges of the film, or a hot air jet mouth may be disposed at therearound. When the film is stretched in such a temperature profile condition, then it may be stretched more uniformly than that stretched at a constant temperature.

Preferably, the angle θ formed by the machine direction (MD) and the slow axis of Re of the film is nearer to 0°, +90° or −90°. Concretely, in MD-stretching, the angle is preferably nearer to 0°, more preferably 0±3°, even more preferably 0±2°, still more preferably 0±1°. In TD-stretching, the angle is preferably 90±3° or −90±3°, more preferably 90±2° or −90±2°, even more preferably 90±1° or −90±1°.

<Surface Treatment>

The cellulose acylate film of the invention may be optionally subjected to surface treatment to thereby improve the adhesiveness between the cellulose acylate film and various functional layers (e.g., undercoat layer, back layer) adjacent thereto. The surface treatment is, for example, glow discharge treatment, UV irradiation treatment, corona treatment, flame treatment, or acid or alkali treatment. The glow discharge treatment as referred to herein may be low-temperature plasma treatment to be effected under a low gas pressure of from $10^{-3}$ to 20 Torr, or may be plasma treatment under atmospheric pressure.

The plasma-exciting vapor to be used in the plasma treatment is a vapor that is excited by plasma under the condition as above. The plasma-exciting vapor includes, for example, argon, helium, neon, krypton, xenon, nitrogen, carbon dioxide, flons such as tetrafluoromethane, and their mixtures. Their details are described in Hatsumei Kyokai Kokai Giho (Kogi No. 2001-1745, published by Hatsumei Kyokai on Mar. 15, 2001), pp. 30-32. For the plasma treatment in air that has become specifically noted recently, preferably used is irradiation energy of from 20 to 500 KGy under 10 to 1000 Kev, more preferably from 20 to 300 KGy under 30 to 500 Kev.

Of the above-mentioned treatments, the most preferred treatment is alkali saponification, and this is extremely effective for the surface treatment of cellulose acylate films.

For the alkali saponification, the film to be processed may be dipped in a saponification solution or may be coated with it. In the dipping method, a cellulose acylate film is dipped in a dipping solution of an aqueous NaOH or KOH solution having a pH of from 10 to 14 and warmed at 20 to 80° C., for 0.1 to 10 minutes, and then neutralized, washed with water and dry ed.

When the alkali saponification is attained according to a coating method, employable for it are a dip-coating method, a curtain-coating method, an extrusion-coating method, a bar-coating method and an E-type coating method. The solvent for the alkali saponification coating solution is preferably so selected that the saponification solution comprising it is well wettable on a transparent support to which the solution is applied, and that the solvent does not roughen the surface of the transparent support and may keep the support having a good surface condition. Concretely, alcohol solvents are preferred, and isopropyl alcohol is especially preferred. An aqueous solution of surfactant may also be used as the solvent. The alkali to be in the alkali saponification coating solution is preferably an alkali soluble in the above-mentioned solvent. More preferably, it is KOH or NaOH. The pH of the saponification coating solution is preferably at least 10, more preferably at least 12. The alkali saponification time is preferably from 1 second to 5 minutes at room temperature, more preferably from 5 seconds to 5 minutes, even more preferably from 20 seconds to 3 minutes.

After the alkalis saponification treatment, it is desirable that the saponification solution-coated surface of the film is washed with water or with an acid, and then further washed with water. If desired, the coating saponification treatment may be effected continuously with the oriented film removal treatment that will be mentioned hereinunder. In that manner, the number of the processing steps in producing the film may be decreased. Concretely, for example, the saponification method is described in JP-A-2002-82226 and WO02/46809, and this may be employed herein.

The above-mentioned surface treatment may be effected by itself or as combined with the last step in the process of film formation. Further, the surface treatment may also be effected in the step of forming functional groups to be mentioned hereinunder.

[Undercoat Layer]

Preferably, the cellulose acylate film of the invention is provided with an undercoat layer for improving the adhesiveness to the functional layers mentioned hereinunder. The undercoat layer may be formed on the cellulose acylate film after the above-mentioned surface treatment, or may be directly formed on the film with no surface treatment. The details of the undercoat layer are described in Hatsumei Kyokai Kokai Giho (Kogi No. 2001-1745, published by Hatsumei Kyokai on Mar. 15, 2001), p. 32.

The step of forming the undercoat layer may be carried out singly or as combined with the last step in the process of film formation. Further, the step of forming the undercoat layer may also be carried out along with the step of forming the functional groups to be mentioned hereinunder.

[Functional Group]

The cellulose acylate film may have functional layers. The functional layers are preferably a combination of the functional layers described in detail in Hatsumei Kyokai Kokai Giho (Kogi No. 2001-1745, published by Hatsumei Kyokai on Mar. 15, 2001), pp. 32-45. Above all, it is desirable that the film has a polarizing layer (polarizer), an optically-compensatory layer (optically-compensatory sheet) and an antireflection layer (antireflection film).

(1) Formation of Polarizing Layer (Formation of Polarizer):

The cellulose acylate film of the invention may have a polarizing layer, and it may serve as a polarizer.

<Material to be Used>

At present, one general method of producing commercially-available polarizing films comprises dipping a stretched binder (polymer) in a solution containing iodine or dichroic dye to thereby infiltrate iodine or dichroic dye into the binder. As the polarizing film, a coated polarizing film such as typically that by Optiva Inc. may be utilized. Iodine and dichroic dye in the polarizing film are oriented in the binder and express the polarization property.

The dichroic dye includes azo dyes, stilbene dyes, pyrazolone dyes, triphenylmethane dyes, quinoline dyes, oxazine dyes, thiazine dyes and anthraquinone dyes, and water-soluble dyes are preferably used in the invention. Also preferably, the dichroic dye for use herein has a hydrophilic substituent (e.g., sulfo, amino, hydroxyl). For example, the compounds described in Hatsumei Kyokai Kokai Giho (Kogi No. 2001-1745, p. 58 (published on Mar. 15, 2001) may be used as the dichroic dye herein.

For the binder for the polarizing film, usable are a polymer that is crosslinkable by itself, and a polymer that is crosslinkable with a crosslinking agent. These polymers may be combined for use herein. The polymer includes, for example, methacrylate copolymers, styrene copolymers, polyolefins, polyvinyl alcohols, modified polyvinyl alcohols, poly(N-methylolacrylamides), polyesters, polyimides, vinyl acetate copolymers, carboxymethyl cellulose and polycarbonates, as in JP-A-8-338913, paragraph [0022]. In addition, a silane coupling agent may also be used as the polymer.

Preferably, the polymer for the polarizing film binder is a water-soluble polymer (e.g., poly(N-methylolacrylamide), carboxymethyl cellulose, gelatin, polyvinyl alcohol, modified polyvinyl alcohol), more preferably gelatin, polyvinyl alcohol or modified polyvinyl alcohol, even more preferably polyvinyl alcohol or modified polyvinyl alcohol. Especially preferably, two or more different types of polyvinyl alcohols or modified polyvinyl alcohols having a different degree of polymerization are combined for use here n.

Preferably, the degree of saponification of the polyvinyl alcohol for use herein is from 70 to 100%, more preferably from 80 to 100%. Also preferably, the degree of polymerization of the polyvinyl alcohol is from 100 to 5000. Modified polyvinyl alcohols having a different degree of polymerization are described in JP-A-8-338913, 9-152509 and 9-316127, and these may be used herein. Two or more different types of polyvinyl alcohols and modified polyvinyl alcohols may be combined for use herein.

Preferably, the lowermost limit of the thickness of the binder of the polarizing film is 10 μm. Regarding the uppermost limit of the thickness thereof, it is preferably thinner from the viewpoint of the light leakage resistance of liquid-crystal display devices that comprise the polarizer. Concretely, for example, it is desirable that the thickness of the polarizing film is on the same level as that of currently commercially-available polarizers (about 30 μm), more preferably it is 25 μm, even more preferably 20 μm.

The binder of the polarizing film may be crosslinked. A polymer or a monomer having a crosslinking functional group may be incorporated into the binder, or the binder polymer may be so designed that it has a crosslinking functional group. The crosslinking may be attained through exposure to light or heat or through pH change, and it gives a binder having a crosslinked structure. The crosslinking agent is described in U.S. Reissue Pat. No. 23,297. A boron compound (e.g., boric acid, borax) may also be used as a crosslinking agent. The amount of the crosslinking agent to be added to the binder is preferably from 0.1 to 20% by mass of the binder. When the amount of the crosslinking agent falls between 0.1 and 20% by mass, then it is preferable since the orientation of the polarizer element and the wet heat resistance of the polarizing film are both good. After the crosslinking reaction, it is desirable that the amount of the unreacted crosslinking agent still remaining in the polarizing film is at most 1.0% by mass, more preferably at most 0.5% by mass. When the amount of the unreacted crosslinking agent is at most 1.0% by mass, then the polarizing film may have good weather resistance.

<Stretching>

Preferably, the polarizing film is stretched (according to a stretching process) or rubbed (according to a rubbing process), and then dyed with iodine or dichroic dye.

In the stretching process, the draw ratio is preferably from 2.5 to 30 times, more preferably from 3 to 10 times. The stretching may be attained in dry in air. Contrary to this, the stretching may also be attained in wet while the film is dipped in water. Preferably, the draw ratio in the dry stretching is from 2.5 to 5 times, and the draw ratio in the wet stretching is from 3 to 10 times. The stretching may be attained in parallel to the MD direction (parallel stretching) or in the direction oblique to the MD direction (oblique stretching). The stretching may be effected once, or a few times. When the stretching is effected a few times, then the film may be uniformly stretched even at a high draw ratio. Preferably, the film is stretched obliquely in the direction inclined by from 10 to 80 degrees relative to the MD direction.

(a) Parallel Stretching Method:

Before stretched, the PVA film is swollen. The degree of swelling of the film is from 1.2 to 2.0 times (in terms of the ratio by weight of the non-swollen film to the swollen film). Next, the film is continuously conveyed via guide rolls, and led into a bath of an aqueous medium or into a dyeing bath of a dichroic substance solution. In the bath, the film is stretched at a bath temperature of from 15 to 50° C., preferably from 17 to 40° C. The stretching may be effected by holding the film with two pairs of nip rolls, and the conveying speed of the latter-stage nip rolls is kept higher than that of the former-stage nip rolls. The draw ratio in stretching is represented by a ratio of the length of the stretched film/the length of the original (unstretched) film (the same shall apply hereinunder). In view of the above-mentioned effects and advantages, the draw ratio is preferably from 1.2 to 3.5 times, more preferably from 1.5 to 3.0 times. Next, the stretched film is dried at 50 to 90° C. to be a polarizing film.

(b) Oblique Stretching Method:

For the oblique stretching method employable herein, referred to is the method described in JP-A-2002-86554. The method comprises using a tenter tensed in the direction oblique to the machine direction, and stretching a film with it. The stretching is effected in air, and therefore the film to be stretched must be previously watered so as to facilitate its stretching. Preferably, the water content of the watered film is from 5 to 100%, more preferably from 10 to 100%.

Preferably, the temperature in stretching is from 40 to 90° C., more preferably from 50 to 80° C. Also preferably, the humidity in stretching is from 50 to 100% RH, more preferably from 70 to 100% RH, even more preferably from 80 to 100% RH. The film traveling speed in the machine direction in stretching is preferably at least 1 m/min, more preferably at least 3 m/min.

After thus stretched, the film is then dried at 50 to 100° C., preferably at 60 to 90° C., for 0.5 to 10 minutes, preferably for 1 to 5 minutes.

Preferably, the absorption axis of the polarizing film thus obtained is from 10 to 80°, more preferably from 30 to 60°, even more preferably substantially 45° (40 to 50°).

<Lamination>

The saponified cellulose acylate film is laminated with a polarizing layer that is prepared by stretching the polarizing film to construct a polarizer. The direction in which the two are laminated is preferably so controlled that the casting axis direction of the cellulose acylate film crosses the stretching axis direction of the polarizer at an angle of 45 degrees.

Not specifically defined, the adhesive for the lamination may be an aqueous solution of a PVA resin (including modified PVA with any of acetoacetyl group, sulfonic acid group, carboxyl group or oxyalkylene group) or a boron compound. Above all, preferred are PVA resins. The thickness of the adhesive layer is preferably from 0.01 to 10 μm, more preferably from 0.05 to 5 μm, after dried.

The light transmittance of the thus-obtained polarizer is preferably higher, and the degree of polarization thereof is also preferably higher. Concretely, the transmittance of the polarizer preferably falls between 30 and 50% for the light having a wavelength of 550 nm, more preferably between 35 and 50%, most preferably between 40 and 50%. The degree of polarization of the polarizer preferably falls between 90 and 100% for the light having a wavelength of 550 nm, more preferably between 95 and 100%, most preferably between 99 and 100%.

Further, the thus-constructed polarizer may be laminated with a λ/4 plate to form a circularly-polarizing plate. In this case, the two are so laminated that the slow axis of the λ/4 plate meets the absorption axis of the polarizer at an angle of 45 degrees. In this, the λ/4 plate is not specifically defined but preferably has a wavelength dependency in that its retardation is smaller at a lower wavelength. Further, it is also desirable to use a λ/4 plate that comprises a polarizing film of which the absorption axis is inclined by 20 to 70° relative to the machine direction and an optically-anisotropic layer of a liquid-crystalline compound.

(2) Formation of Optically-Compensatory Layer (Formation of Optically-Compensatory Film):

The optically-anisotropic layer is for compensating the liquid-crystalline compound in the liquid-crystal cell for black display in liquid-crystal display devices, and this may be constructed by forming an orientation film on the cellulose acylate film followed by further forming thereon an optically-anisotropic layer.

<Orientation Film>

For forming the optically-anisotropic layer, an orientation film may be provided on the surface-treated cellulose acylate film. The orientation film has the function of defining the orientation direction of liquid-crystal molecules. However, if a liquid-crystalline compound can be oriented and then its orientation can be fixed, then the orientation film may be omitted. In this case, on the liquid-crystalline compound of which the orientation condition has been fixed, only the optically-anisotropic layer may be transferred onto the polarizer element to construct the polarizer.

The orientation film may be formed, for example, through rubbing treatment of an organic compound (preferably polymer) oblique vapor deposition of an inorganic compound, formation of a microgrooved layer, or accumulation of an organic compound (e.g., ω-tricosanoic acid, dioctadecylmethylammonium chloride, methyl stearate) according to a Langmuir-Blodgett's method (LB film). Further, there are known other orientation films that may have an orientation function through impartation of an electric field or magnetic field thereto or through light irradiation thereto. In this invention, the orientation film is preferably formed through rubbing treatment of a polymer. In principle, the polymer to be used for the orientation treatment has a molecular structure that has the function of orienting liquid-crystalline molecules.

Preferably, the polymer for use in the invention has crosslinking functional group (e.g., double bond)—having side branches bonded to the backbone chain or has a crosslinking functional group having the function of orienting liquid-crystalline molecules introduced into the side branches thereof, in addition to having the function of orienting liquid-crystalline molecules.

The polymer to be used for the orientation film may be a polymer that is crosslinkable by itself or a polymer that is crosslinkable with a crosslinking agent, or may also be a combination of the two. Examples of the polymer are methacrylate copolymers, styrene copolymers, polyolefins, polyvinyl alcohols and modified polyvinyl alcohols, poly(N-methylolacrylamides), polyesters, polyimides, vinyl acetate copolymers, carboxymethyl cellulose and polycarbonates, as in JP-A-8-338913, paragraph [0022]. A silane coupling agent is also usable as the polymer. Preferably, the polymer is a water-soluble polymer (e.g., poly(N-methylolacrylamide), carboxymethyl cellulose, gelatin, polyvinyl alcohol, modified polyvinyl alcohol), more preferably gelatin, polyvinyl alcohol or modified polyvinyl alcohol, most preferably polyvinyl alcohol or modified polyvinyl alcohol. Especially preferably, two or more different types of polyvinyl alcohols or modified polyvinyl alcohols having a different degree of polymerization are combined for use as the polymer. Preferably, the degree of saponification of the polyvinyl alcohol for use herein is from 70 to 100%, more preferably from 80 to 100%. Also preferably, the degree of polymerization of the polyvinyl alcohol is from 100 to 5000.

The side branches having the function of orienting liquid-crystalline molecules generally have a hydrophobic group as the functional group. Concretely, the type of the functional group may be determined depending on the type of the liquid-crystalline molecules to be oriented and on the necessary orientation condition of the molecules. For example, the modifying group of the modified polyvinyl alcohol may be introduced into the polymer through copolymerization modification, chain transfer modification or block polymerization modification. Examples of the modifying group are a hydrophilic group (e.g., carboxylic acid group, sulfonic acid group, phosphonic acid group, amino group, ammonium group, amido group, thiol group), a hydrocarbon group having from 10 to 100 carbon atoms, a fluorine atom-substituted hydrocarbon group, a thioether group, a polymerizing group (e.g., unsaturated polymerizing group, epoxy group, aziridinyl group), and an alkoxysilyl group (e.g., trialkoxy, dialkoxy, monoalkoxy). Specific examples of such modified polyvinyl alcohol compounds are described, for example, in JF-A-2000-155216, paragraphs [0022] to [0145], and in JP-A-2002-62426, paragraphs [0018] to [0022].

When crosslinking functional group-having side branches are bonded to the backbone chain of the orientation film polymer, or when a crosslinking functional group is introduced into the side chains of the polymer having the function of orienting liquid-crystalline molecules, then the polymer of the orientation film may be copolymerized with the polyfunctional monomer in the optically-anisotropic layer. As a result, not only between the polyfunctional polymers but also between the orientation film polymers, and even between the polyfunctional monomer and the orientation film polymer, they may be firmly bonded to each other in a mode of covalent bonding to each other. Accordingly, introducing such a crosslinking functional group into the orientation film polymer significantly improves the mechanical strength of the optically-compensatory sheet.

Preferably, the crosslinking functional group of the orientation film polymer contains a polymerizing group, like the polyfunctional monomer. Concretely, for example, those described in JP-A-2000-155216, paragraphs [0080] to [0100] are referred to herein. Apart from the above-mentioned crosslinking functional group, the orientation film polymer may also be crosslinked with a crosslinking agent.

The crosslinking agent includes, for example, aldehydes, N-methylol compounds, dioxane derivatives, compounds acting through activation of the carboxyl group thereof, active vinyl compounds, active halide compound, isoxazoles and dialdehyde starches. Two or more different types of crosslinking agents may be combined for use herein. Concretely, for example, the compounds described in JP-A-2002-62426, paragraphs [0023] to [0024] are employable herein. Preferred are aldehydes of high reactivity, and more preferred is glutaraldehyde.

Preferably, the amount of the crosslinking agent to be added is from 0.1 to 20% by mass of the polymer, more preferably from 0.5 to 15% by mass. Also preferably, the amount of the unreacted crosslinking agent that may remain in the orientation film is at most 1.0% by mass, more preferably at most 0.5% by mass. When the crosslinking agent in the orientation film is controlled to that effect, then the film ensures good durability with no reticulation even though it is used in liquid-crystal display devices for a long period of time and even though it is left in a high-temperature high-humidity atmosphere for a long period of time.

Basically, the orientation film may be formed by applying the orientation film-forming material of the above-mentioned polymer to a crosslinking agent-containing transparent support, then heating and drying it (for crosslinking it) and then rubbing the thus-formed film. The crosslinking reaction may be effected in any stage after the film-forming material has been applied onto the transparent support, as so mentioned hereinabove. When a water-soluble polymer such as polyvinyl alcohol is used as the orientation film-forming material, then it is desirable that the solvent for the coating solution is a mixed solvent of a defoaming organic solvent (e.g., methanol) and water. The ratio by mass of water/methanol preferably falls between 0/100 and 99/1, more preferably between 0/100 and 91/9. The mixed solvent of the type is effective for formation of bubbles in the coating solution and, as a result, the surface defects of the orientation film and even the optically-anisotropic layer are greatly reduced.

For forming the orientation film, preferably employed is a spin-coating method, a dip-coating method, a curtain-coating method, an extrusion-coating method, a rod-coating method or a roll-coating method. Especially preferred is a rod-coating method. Also preferably, the thickness of the film is from 0.1 to 10 µm, after dried. The drying under heat may be effected at 20 to 110° C. For sufficient crosslinking, the heating temperature is preferably from 60 to 100° C., more preferably from 80 to 100° C. The drying time may be from 1 minute to 36 hours, but preferably from 1 to 30 minutes. The pH of the coating solution is preferably so defined that it is the best for the crosslinking agent used. For example, when glutaraldehyde is used, the pH of the coating solution is preferably from 4.5 to 5.5, more preferably pH 5.

The orientation film is provided on the transparent support or on the undercoat layer. The orientation film may be formed by crosslinking the polymer layer as above, and then rubbing the surface of the layer.

For the rubbing treatment, usable is any method widely employed for liquid crystal orientation treatment for LCD. Concretely, for example, the surface of the orientation film is rubbed in a predetermined direction by the use of paper, gauze, felt, rubber, nylon, or polyester fibers, whereby the film may be oriented in the intended direction. In general, a cloth uniformly planted with fibers having the same length and the same thickness is used, and the surface of the film is rubbed a few times with the cloth.

On an industrial scale, the operation may be attained by contacting a rolling rubbing roll to a polarizing layer-having film that is traveling in the system. Preferably, the circularity, the cylindricity, and the eccentricity of the rubbing roll are all at most 30 µm each. Also preferably, the lapping angle of the film around the rubbing roll is from 0.1 to 90°. However, the film may be lapped to an angle of 360° or more for stable rubbing treatment, as in JP-A-8-160430. Preferably, the film traveling speed is from 1 to 100 m/min. The rubbing angle may fall between 0 and 600, and it is desirable that a suitable rubbing angle is selected within the range. When the film is used in liquid-crystal displays, the rubbing angle is preferably from 40 to 50°, more preferably 45°.

The thickness of the orientation film thus obtained may be from 0.1 µm 10 µm, preferably from 0.1 to 5 µm, more preferably from 0.2 to 3 µm.

<Optically-Anisotropic Layer>

Next, an optically-anisotropic layer is formed on the orientation film, and the liquid-crystalline molecules in the layer are oriented. Then, if desired, the orientation film polymer is reacted with the polyfunctional monomer in the optically-anisotropic layer, or the orientation film polymer is crosslinked with a crosslinking agent.

The liquid-crystalline molecules in the optically-anisotropic layer includes columnar liquid-crystalline molecules and discotic liquid-crystalline molecules. The columnar liquid-crystalline molecules and the discotic liquid-crystalline molecules may be high-molecular liquid crystals or low-molecular liquid crystals. In addition, they include crosslinked low-molecular liquid crystals that do not exhibit liquid crystallinity.

(Columnar Liquid-Crystalline Molecules)

The Columnar liquid-crystalline molecules are preferably azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolanes and alkenylcyclohexylbenzonitriles.

The columnar liquid-crystalline molecules include metal complexes. Liquid-crystal polymers that contain columnar liquid-crystalline molecules in the repetitive units are also usable herein the columnar liquid-crystalline molecules. In other words, the columnar liquid-crystalline molecules for use herein may bond to (liquid-crystal) polymer. Columnar liquid-crystalline molecules are described in *Quarterly Journal of General Chemistry*, Vol. 22, Liquid Crystal Chemistry (1994), Chaps. 4, 7 and 11, edited by the Chemical Society of Japan; *Liquid Crystal Devices Handbook*, edited by the 142nd Committee of the Nippon Academic Promotion, Chap. 3.

The birefringence of the columnar liquid-crystalline molecule may fall between 0.001 and 0.7, but preferably between 0.01 and 0.5, more preferably between 0.03 and 0.4. Preferably, the columnar liquid-crystalline molecules have a polymerizing group for fixing their orientation condition. The polymerizing group is preferably a radical-polymerizing unsaturated group or a cationic polymerizing group. Concretely, for example, there are mentioned the polymerizing groups and the polymerizing liquid-crystal compounds described in JP-A-2002-62427, paragraphs [0064] to [0086].

(Discotic Liquid-Crystalline Molecules)

The discotic liquid-crystalline molecules include, for example, benzene derivatives as in C. Destrade et al's study report, *Mol. Cryst.*, Vol. 71, p. 111 (1981); truxene derivatives as in C. Destrade et al's study report, *Mol. Cryst., Vol.* 122, p. 141 (1985), *Physics Lett. A.*, Vol. 78, p. 82 (1990); cyclohexane derivatives as in B. Kohne et al's study report, *Angew. Chem.*, Vol. 96, p. 70 (1984); and azacrown-type or phenylacetylene-type macrocycles as in J. M. Lehn et al's study report, *J. Chem. Commun., p.* 1794 (1985), J. Zhang et al's study report, *J. Am. Chem. Soc.*, Vol. 116, p. 2655 (1994).

The discotic liquid-crystalline molecules include liquid-crystalline compounds in which the molecular center nucleus is radially substituted with side branches of a linear alkyl, alkoxy or substituted benzoyloxy group. Preferably, the molecules or the molecular aggregates of the compounds are rotary-symmetrical and may undergo certain orientation. It's no always necessary that, in the optically-anisotropic layer formed of such discotic liquid-crystalline molecules, the compounds that are finally in the optically-anisotropic layer are discotic liquid-crystalline molecules. For example, low-molecular discotic liquid-crystalline molecules may have a group capable of being reactive when exposed to hear or light, and as a result, they may polymerize or crosslink through thermal or optical reaction to give high-molecular compounds with no liquid crystallinity. In the invention, the optically-anisotropic layer may contain such a high-molecular, non-liquid crystalline compound. Preferred examples of the discotic liquid-crystalline molecules are described in JP-A-8-50206. Polymerization of discotic liquid-crystalline molecules is described in JP-A-8-27284.

For fixing the discotic liquid-crystalline molecules through polymerization, the discotic core of the discotic liquid-crystalline molecules must be substituted with a polymerizing group. Preferably, the polymerizing group bonds to the discotic core via a linking group. Accordingly, the compounds of the type may keep their orientation condition even after their polymerization. For example, there are mentioned the compounds described in JP-A-2000-155216, paragraphs [0151] to [0168].

In hybrid orientation, the angle between the major axes (disc plane) of the discotic liquid-crystalline molecules and the plane of the polarizing film increases or decreases with the increase in the distance from the plane of the polarizing film in the depth direction of the optically-anisotropic layer. Preferably, the angle decreases with the increase in the distance.

The angle change may be in any mode of continuous increase, continuous decrease, intermittent increase, intermittent decrease, change including continuous increase and continuous decrease, or intermittent change including increase and decrease. The intermittent change includes a region in which the tilt angle does not change in the midway of the thickness direction. The angle may include a region with no angle change so far as it increases or decreases as a whole. Preferably, the angle continuously varies.

The mean direction of the major axis of the discotic liquid-crystalline molecules on the polarizing film side may be controlled generally by suitably selecting the material of the discotic liquid-crystalline molecules or that of the orientation film or by suitably selecting the rubbing treatment method. The direction of the major axis of the discotic liquid-crystalline molecules (disc plane) on the surface side (on the external airside) may be controlled generally by suitably selecting the material of the discotic liquid-crystalline molecules or that of the additive to be used along with the discotic liquid-crystalline molecules. Examples of the additive that may be used along with the discotic liquid-crystalline molecules includes, for example, plasticizer, surfactant, polymerizing monomer and polymer. Like in the above, the degree of the change of the major axis in the orientation direction may also be controlled by suitably selecting the liquid-crystalline molecules and the additive.

<Other Composition of Optically-Anisotropic Layer>

Along with the above-mentioned liquid-crystalline molecules, a plasticizer, a surfactant, a polymerizing monomer and others may be added to the optically-anisotropic layer for improving the uniformity of the coating film, the strength of the film and the orientation of the liquid-crystalline molecules. Preferably, the additives have good compatibility with the liquid-crystalline molecules that constitute the layer and may have some influence on the tilt angle change of the liquid-crystalline molecules, not interfering with the orientation of the molecules.

The polymerizing monomer includes radical-polymerizing or cationic-polymerizing compounds. Preferred are polyfunctional radical-polymerizing monomers. Also preferred are those copolymerizable with the above-mentioned, polymerizing group-containing liquid-crystal compounds. For example, herein mentioned are the compounds described in JP-A-2002-296423, paragraphs [0018] to [0020]. The amount of the compound to be added to the layer may be generally from 1 to 50% by mass of the discotic liquid-crystaline molecules in the layer, but preferably from 5 to 30% by mass.

The surfactant may be any known one, but is preferably a fluorine-containing compound. Concretely, for example, there are mentioned the compounds described in JP-A-2001-330725, paragraphs [0028] to [0056].

The polymer that may be used along with the discotic liquid-crystalline molecules is preferably one capable of changing the tilt angle of the discotic liquid-crystalline molecules. Examples of the polymer are cellulose esters. Preferred examples of cellulose esters are described in JP-A-2000-155216, paragraph [0178]. So as not to interfere with the orientation of the liquid-crystalline molecules, the amount of the polymer to be added to the layer is preferably from 0.1 to 10% by mass of the liquid-crystalline molecules, more preferably from 0.1 to 8% by mass. Preferably, the discotic nematic liquid-crystal phase/solid phase transition temperature of the discotic liquid-crystalline molecules falls between 70 and 300° C., more preferably between 70 and 170° C.

<Formation of Optically-Anisotropic Layer>

The optically-anisotropic layer may be formed by applying a coating solution that contains liquid-crystalline molecules and optionally a polymerization initiator and other optional components mentioned below, on the orientation film.

The solvent to be used in preparing the coating solution is preferably an organic solvent. Examples of the organic solvent are amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone), ethers (e.g., tetrahydrofuran, 1,2-dimethoxyethane). Of those, preferred are alkyl halides and ketones. Two or more such organic solvents may be used as combined.

The coating solution may be applied onto the orientation film in any known method (e.g., wire bar coating, extrusion coating, direct gravure coating, reverse gravure coating, die coating).

The thickness of the optically-anisotropic layer is preferably from 0.1 to 20 μm, more preferably from 0.5 to 15 μm, even more preferably from 1 to 10 μm.

<Fixation of Orientation Condition of Liquid-Crystalline Molecules>

The oriented liquid-crystalline molecules may be fixed as they are in orientation. Preferably, the fixation is effected through polymerization. The polymerization includes thermal polymerization with a thermal polymerization initiator and optical polymerization with an optical polymerization initiator. Preferred is optical polymerization.

The optical polymerization initiator includes, for example, α-carbonyl compounds (as in U.S. Pat. Nos. 2,367,661, 2,367,670) acyloin ethers (as in U.S. Pat. No. 2,448,828), α-hydrocarbon-substituted aromatic acyloin compounds (as in U.S. Pat. No. 2,722,512), polynuclear quinone compounds (as in U.S. Pat. Nos. 3,046,127, 2,951,758), combination of triarylimidazole dimer and p-aminophenylketone (as in U.S. Pat. No. 3,549,367), acridine compounds and phenazine compounds (as in JP-A-60-105667, U.S. Pat. No. 4,239,850), and oxadiazole compounds (as in U.S. Pat. No. 4,212,970).

The amount of the optical polymerization initiator to be added is preferably from 0.01 to 20% by mass of the solid content of the coating solution, more preferably from 0.5 to 5% by mass.

Preferably, UV rays are used for light irradiation for polymerization of the liquid-crystalline molecules. Preferably, the irradiation energy falls within a range of from 20 to 5000 mJ/cm$^2$, more preferably from 100 to 800 mJ/cm$^2$. For promoting the optical polymerization, the light irradiation may be effected under heat.

A protective layer may be further provided on the optically-anisotropic layer. Not specifically defined, the protective layer may be formed of a transparent resin. For example, the resin may be a thermoplastic resin such as cellulose derivatives, polyesters, polycarbonates or polyacrylates, or a thermosetting resin such as crosslinking acrylic resins or epoxy resins. Preferably, the thickness of the protective layer is from 0.1 to 10 μm, more preferably from 0.2 to 5 μm, even more preferably from 0.2 to 3 μm.

Preferably, the optically-compensatory film is combined with a polarizing layer. Concretely, the above-mentioned optically-anisotropic layer-coating solution is applied onto the surface of a polarizing film to from an optically-anisotropic layer thereon. As a result, no polymer film exists between the polarizing film and the optically-anisotropic layer, and a thin polarizer is thus constructed of which the stress (strain× cross section×elasticity) to be caused by the dimensional change of the polarizing film is reduced. When the polarizer of the invention is fitted to large-size liquid-crystal display devices, then it does not produce a problem of light leakage and the devices can display high-quality images.

Preferably, the polarizing layer and the optically-compensatory layer are so stretched that the tilt angle between the two may correspond to the angle formed by the transmission axis of the two polarizers to be stuck to both sides of the liquid crystal cell to constitute LCD, and the machine direction or the transverse direction of the liquid crystal cells. In general, the tilt angle is 45°. Recently, however, some devices in which the tile angle is not 45° have been developed for transmission-type, reflection-type or semi-transmission-type LCDS, and it is desirable that the stretching direction is varied in any desired manner depending on the plan of LCDs.

<Liquid-Crystal Display Device>

Various liquid-crystal modes in which the above-mentioned optically-compensatory film is used are described below.

(TN-Mode Liquid-Crystal Display Device)

A TN-mode is most popularly utilized in color TFT liquid-crystal display devices, and this is described in a large number of references. The orientation condition in the liquid-crystal cell for TN-mode black display is as follows: The columnar liquid-crystalline molecules stand up in the center of the cell, and they lie down at around the substrate of the cell.

(OCB-Mode Liquid-Crystal Display Device)

This is a bent-orientation mode liquid-crystal cell in which the columnar liquid-crystalline molecules are oriented substantially in the opposite directions (symmetrically) between the upper part and the lower part of the liquid-crystal cell. The liquid-crystal display device that comprises such a bent-orientation mode liquid-crystal cell is disclosed in U.S. Pat. Nos. 4,583,825 and 5,410,422. In this, since the columnar liquid-crystalline molecules are symmetrically oriented in the upper part and the lower part of the liquid-crystal cell, the bent-orientation mode liquid-crystal cell has a self-optically-compensatory function. Accordingly, the liquid-crystal mode of the type is referred to as an OCB (optically-compensatory bent) liquid-crystal mode.

Regarding the orientation condition for black display in the OCB-mode liquid-crystal cell, the columnar liquid-crystalline molecules standup in the center of the cell, and they lie down at around the substrate of the cell, like in the TN-mode liquid-crystal cell.

(VA-Mode Liquid-Crystal Display Device)

This is characterized in that the columnar liquid-crystalline molecules therein are substantially vertically oriented in the absence of voltage application thereto. The VA-mode liquid-crystal cell includes (1) a VA-mode liquid-crystal cell in the narrow sense of the word, in which the columnar liquid-crystalline molecules are substantially vertically oriented in the absence of voltage application thereto but are substantially horizontally oriented in the presence of voltage application thereto (as in JP-A-2-176625), further including in addition to it, (2) a multi-domain VA-mode (MVA-mode) liquid crystal cell for viewing angle expansion (as in SID97, Digest of Tech. Papers (preprint), 28 (1997) 845), (3) an n-ASM-mode liquid-crystal cell in which the columnar liquid-crystalline molecules are substantially vertically oriented in the absence of voltage application thereto but are subjected to twisted multi-domain orientation in the presence of voltage application thereto (as in the preprint in the Nippon Liquid Crystal Discussion Meeting, 58-59 (1998)), and (4) a SUR-VAIVAL-mode liquid-crystal cell (as announced in LCD International 98).

(Other Liquid-Crystal Display Devices)

ECB-mode and STN-mode liquid-crystal display devices may be optically compensated in the same consideration as above.

(3) Formation of Antireflection Film:

In general, an antireflection film is constructed by forming a low-refractivity layer that functions as a stain-preventing layer, and at least one layer having a higher refractivity than the low-refractivity layer (high-refractivity layer or middle-refractivity layer) on a transparent substrate.

A multi-layer film is formed by laminating transparent thin films of inorganic compounds (e.g., metal oxides) having a different refractivity, for example, in a mode of chemical vapor deposition (CVD) or physical vapor deposition (PVD); or a film of colloidal metal oxide particles is formed according to a sol-gel process with a metal compound such as a metal oxide, and then this is post-treated (e.g., UV irradiation as in JP-A-9-157855, or plasma treatment as in JP-A-2002-327310) to give a thin film.

On the other hand, various types of antireflection films of high producibility are proposed, which are formed by laminating thin films of inorganic particles dispersed in a matrix. The antireflection films produced according to the above-mentioned coating methods may be further processed so that the surface of the outermost layer thereof is roughened to have an antiglare property. The cellulose acylate film of the invention may be applied to any type of the antireflection films mentioned hereinabove. Especially preferably, the film is applied to antireflection films constructed in a layers-coating system (layers-coated antireflection films).

<Layer Constitution of Layers-Coated Antireflection Film>

The antireflection film having a layer constitution of at least a middle-refractivity layer, a high-refractivity layer and a low-refractivity layer (outermost layer) formed in that order on a substrate is so planned that it satisfies the refractivity profile mentioned below.

Refractivity of high-refractivity layer>refractivity of middle-refractivity layer>refractivity of transparent support>refractivity of low-refractivity layer.

A hard coat layer may be disposed between the transparent support and the middle-refractivity layer. Further, the layers-coated antireflection film may comprise a middle-refractivity hard coat layer, a high-refractivity layer and a low-refractivity layer. For example, JP-A-8-122504, 8-110401, 10-300902, 2002-243906, 2000-111706 are referred to.

The constitutive layers may have other functions. For example, there are mentioned a stain-resistant low-refractivity layer and an antistatic high-refractivity layer (as in JP-A-10-206603, 2002-243906).

Preferably, the haze of the antireflection film is at most 5%, more preferably at most 3%. Also preferably, the strength of the antireflection film is at least 1H measured in the pencil hardness test according to JIS K5400, more preferably at least 2H, most preferably at least 3H.

<High-Refractivity Layer>

The high-refractivity layer of the antireflection film is formed of a cured film that contains at least ultrafine particles of an inorganic compound of high refractivity having a mean particle size of at most 100 nm and a matrix binder.

The high-refractivity inorganic compound particles are those of an inorganic compound having a refractivity of at least 1.65, preferably at least 1.9. The inorganic compound particles are, for example, those of a metal oxide with any of Ti, Zn, Sb, Sn, Zr, Ce, Ta, La and In, and those of a composite oxide with such metal atoms.

For example, the ultrafine particles may be processed with a surface-treating agent (e.g., silane coupling agent as in JP-A-11-295503, 11-153703, 2000-9908; anionic compound or organic metal coupling agent as in JP-A-2001-310432); or they may have a core/shell structure in which the core is a high-refractivity particle (e.g., as in JP-A-2001-166104); or they may be combined with a specific dispersant (e.g., as in JP-A-11-153703, U.S. Pat. No. 6,210,858, JP-A-2002-2776069).

The material to from the matrix may be any known thermoplastic resin or curable resin film.

For the material, preferred is at least one composition selected from a polyfunctional compound-containing composition in which the compound has at least 2 radical-polymerizing and/or cationic-polymerizing groups, a hydrolyzing group-containing organic metal compound, and its partial condensate composition. For it, for example, referred to are the compounds described in JP-A-2000-47004, 2001-315242, 2001-31871, 2001-296401.

Also preferred is a curable film formed of a colloidal metal oxide obtained from a hydrolyzed condensate of a metal alkoxide, and a metal alkoxide composition. For example, it is described in JP-A-2001-293818.

The refractivity of the high-refractivity layer is generally from 1.70 to 2.20, but preferably from 1.80 to 2.10. Preferably, the thickness of the high-refractivity layer is from 5 nm to 10 μm, more preferably from 10 nm to 1 μm.

The refractivity of the middle-refractivity layer is so controlled that it may be between the refractivity of the low-refractivity layer and that of the high-refractivity layer. Preferably, the refractivity of the middle-refractivity layer is from 1.50 to 1.70.

<Low-Refractivity Layer>

The low-refractivity layer is laminated on the high-refractivity layer. The refractivity of the low-refractivity layer may be from 1.20 to 1.55, but preferably from 1.30 to 1.50. Preferably, the low-refractivity layer is, constructed as the outermost layer having good scratch resistance and stain resistance. For increasing the scratch resistance of the layer, it is effective to lubricate the surface of the layer. For it, for example, a thin-film layer may be formed on the surface of the low-refractivity layer through conventional silicone introduction or fluorine introduction.

Preferably, the refractivity of the fluorine-containing compound is from 1.35 to 1.50, more preferably from 1.36 to 1.47. Also preferably, the fluorine-containing compound has a crosslinking or polymerizing functional group that contains a fluorine atom in an amount of from 35 to 80% by mass. For example, herein usable are the compounds described in JP-A-9-222503, paragraphs [0018] to [0026], JP-A-11-38202, paragraphs [0019] to (00301, JP-A-2001-40284, paragraphs [0027] to [0028], and JP-A-2000-284102.

Preferably, the silicone compound has a polysiloxane structure in which the polymer chain contains a curable functional group or a polymerizing functional group, and it forms a film having a crosslinked structure therein. For example, it includes reactive silicones (e.g., Silaplane (from Chisso), and polysiloxanes double-terminated with a silanol group (as in JP-A-11-258403).

Preferably, the crosslinking or polymerizing group-having, fluorine-containing and/or siloxane polymer in the outermost layer is crosslinked or polymerized simultaneously with or after the coating operation of the coating composition to form the outermost layer that contains a polymerization initiator and a sensitizer, by exposing the coating layer to light or heat.

Also preferred is a sol-gel curable film which comprises an organic metal compound such as a silane coupling agent and a specific fluorine-containing hydrocarbon group-having silane coupling agent and in which they are condensed in the presence of a catalyst to cure the film. For example, there are mentioned a polyfluoroalkyl group-containing silane compound or its partial hydrolyzed condensate (as in JP-A-58-142958, 58-147483, 58-147484, 9-157582, 11-106704), and a silyl compound having a fluorine-containing long-chain group, poly(perfluoroalkylether) group (as in JP-A-2000-117902, 2001-48590, 2002-53804).

As other additives than the above, the low-refractivity layer may contain a filler (e.g., low-refractivity inorganic compound of which the primary particles have a mean particle size of from 1 to 150 nm, such as silicon dioxide (silica), fluorine-containing particles (magnesium fluoride, calcium fluoride, barium fluoride); organic fine particles described in JP-A-11-3820, paragraphs [0020] to [0038]) a silane coupling agent, a lubricant, a surfactant, etc.

When the low-refractivity layer is positioned below the outermost layer, then it may be formed according to a vapor-phase process (e.g., vacuum evaporation, sputtering, ion plating, plasma CVD). However, a coating method is preferred as it produces the layer at low costs.

Preferably, the thickness of the low-refractivity layer is from 30 to 200 nm, more preferably from 50 to 150 nm, most preferably from 60 to 120 nm.

<Hard Coat Layer>

The hard coat layer is disposed on the surface of a transparent support for increasing the physical strength of the antireflection film. In particular, the layer is preferably disposed between a transparent support and the above-mentioned high-refractivity layer. Also preferably, the hard coat layer is formed through crosslinking or polymerization of an optical and/or thermal curable compound. The curable functional group is preferably a photopolymerizing functional group, and the hydrolyzing functional group-containing organic metal compound is preferably an organic alkoxysilyl compound. Specific examples of the compounds may be the same as those mentioned hereinabove for the high-refractivity layer.

Specific examples of the constitutive composition for the hard coat layer are described in, for example, JP-A-2002-144913, 2000-9908, and WOO/46617.

The high-refractivity layer may serve also as a hard coat layer. In such a case, it is desirable that fine particles are added to and finely dispersed in the hard coat layer in the same manner as that mentioned hereinabove for the formation of the high-refractivity layer.

Containing particles having a mean particle size of from 0.2 to 10 μm, the hard coat layer may serve also as an antiglare layer (this will be mentioned hereinunder).

The thickness of the hard coat layer may be suitably determined in accordance with the use of the antireflection film. Preferably, for example, the thickness of the hard coat layer is from 0.2 to 10 μm, more preferably from 0.5 to 7 μm.

Preferably, the strength of the hard coat layer is at least 1H as measured in the pencil hardness test according to JIS K5400, more preferably a: least 2H, most preferably at least 3H. Also preferably, the abrasion of the test piece of layer before and after the taper test according to JIS K5400 is as small as possible.

<Front-Scattering Layer>

A front-scattering layer may be provided in the antireflection film. This is for improving the viewing angle on the upper and lower sides and on the right and left sides of liquid-crystal display devices to which the film is applied. Fine particles having a different refractivity may be dispersed to the hard coat layer, and the resulting hard coat layer may serve also as a front-scattering layer. For it, for example, referred to are JP-A-11-38208 in which the front-scattering coefficient is specifically defined; JP-A-2000-199809 in which the relative refractivity of transparent resin and fine particles is defined to fall within a specific range; and JP-A-2002-107512 in which the haze value is defined to be at least 40%.

<Other Layers>

In addition to the above-mentioned layers, the film may further has a primer layer, an antistatic layer, an undercoat layer, a protective layer, etc.

<Coating Method>

The constitutive layers of the antireflection film may be formed in various coating methods of, for example, dip coating, air knife coating, curtain coating, roller coating, wire bar coating, gravure coating, micro gravure coating or extrusion coating (as in U.S. Pat. No. 2,681,294).

<Antiglare Function>

The antireflection film may have an antiglare function of scattering external light. The film may have the antiglare function by roughening its surface. When the antireflection film has the antiglare function, then its haze is preferably from 3 to 30%, more preferably from 5 to 20%, most preferably from 7 to 20%.

For roughening the surface of the antireflection film, employable is any method in which the roughened surface profile may be kept well. For example, there are mentioned a method of adding fine particles to the low-refractivity layer so as to roughen the surface of the layer (e.g., as in JP-A-2000-271878); a method of adding a small amount (from 0.1 to 50% by mass) of relatively large particles (having a particle size of from 0.05 to 2 μm) to the lower layer (high-refractivity layer, middle-refractivity layer or hard coat layer) below a low-refractivity layer to thereby roughen the surface of the lower layer, and forming the low-refractivity layer on it while keeping the surface profile of the lower layer (e.g., as in JP-A-2000-281410, 2000-95893, 2001-100004, 2001-281407); and a method of physically transferring a roughened profile onto the surface of the outermost layer (stain-resistant layer) (for example, according to embossing treatment as in JP-A-63-278839, 11-183710, 2000-275401).

EXAMPLES

The present invention will be further specifically explained with reference to the following examples of the present invention. The materials, amounts, ratios, types and procedures of treatments and so forth shown in the following examples can be suitably changed unless such changes depart from the gist of the present invention. Accordingly, the scope of the present invention should not be construed as limited to the following specific examples.

Methods for measurement employed in the invention are described below.

(1) Re Unevenness, Rth Unevenness, Thickness Unevenness (a) MD Sampling:

100 pieces each having a size of 1 cm×1 cm are sampled at intervals of 0.5 m in the machine direction (MD). These are MD sample films.

(b) TD Sampling:

50 pieces each having a size of 1 cm×1 cm are sampled at regular intervals in the entire transverse direction of the film, and these are TD sample films.

(c) Re and Rth Measurement:

The sample films are conditioned at 25° C. and 60% RH for at least 3 hours. Using an automatic birefringence meter (KOBRA-21ADH/PR by Oji Instruments), the retardation at a wavelength of 550 nm of the sample film is measured at 25° C. and 60% RH, in the vertical direction relative to the surface of the sample film and in the ±40°-inclined direction from the normal line of the film surface. The in-plane retardation (Re) is derived from the data in the vertical direction; and the thickness-direction retardation (Rth) is from the data in the ±40'-inclined direction from the normal line of the film surface.

(d) Re and Rth Unevenness:

The difference between the maximum value and the minimum value of 100 MD samples and 50 TD samples is divided by the mean value thereof, and it is represented in terms of percentage. This is Re and Rth unevenness.

(e) Determination of Thickness Unevenness:

The thickness of the sample is measured. The difference between the maximum value and the minimum value of 100 MD samples and 50 TD samples is divided by the mean value thereof, and it is represented in terms of percentage. This is thickness unevenness.

(2) Humidity-Dependent Re Change and Humidity-Dependent Rth Change (a) Sampling:

At three points (center, both edges (5% of the entire width from both edges)) in the transverse direction (TD), pieces having a size of 1 cm×1 cm are sampled three times at intervals of 10 m in the machine direction (MD), and 9 pieces are thus samples in total.

(b) Re and Rth Measurement:

The sample films are conditioned at 25° C. and 60% RH for at least 3 hours. Using an automatic birefringence meter (KOBRA-21ADH/PR by Oji Instruments), the retardation at a wavelength of 550 nm of the sample film is measured at 25° C. and 60% RH, in the vertical direction relative to the surface of the sample film and in the ±40°-inclined direction from the normal line of the film surface. The in-plane retardation (Re) is derived from the data in the vertical direction; and the thickness-direction retardation (Rth) is from the data in the ±40°-inclined direction from the normal line of the film surface. These are Re(60) and Rth(60), respectively.

Next, the sample films are measured at 25° C. and 10% RH, and their Re(10) and Rth(10) are calculated. Further, the sample films are measured at 250° C. and 80% RH, and their Re(80) and Rth(80) are calculated.

The humidity-dependent Re change and the humidity-dependent Rth change of each sample are calculated according to the formulae mentioned below, and the data of the thus-analyzed 9 samples are averaged.

$$\text{Humidity-dependent } Re \text{ change } (\%/\% RH) = \{100 \times |Re(80) - Re(10)|/Re(60)\}/70,$$

$$\text{Humidity-dependent } Rth \text{ change } (\%/\% RH) = \{100 \times |Rth(80) - Rth(10)|/Rth(60)\}/70.$$

(3) Degree of Substitution with Cellulose Acylate Group

The degree of acyl substitution with cellulose acylate group is obtained through $^{13}C$-NMR according to the method described in *Carbohydr. Res.*, 273 (1955) pp. 83-91 (Tezuka, et al.)

Example 1

A polarizer with an unstretched cellulose acylate film of the invention built therein was constructed, and checked for the presence or absence of display unevenness.

1. Formation of Unstretched Cellulose Acylate Film (1) Preparation of Cellulose Acylate:

Cellulose acylates were prepared, having a different acyl group and a different degree of substitution as in Table 1. The cellulose acylation was attained by adding 7.8 parts by mass of a catalyst, sulfuric acid to 100 parts by mass of cellulose at 40° C., and then adding thereto a carboxylic acid to be an acyl substituent. In this step, the type and the amount of the carboxylic acid to be added were varied to thereby control the type and the substitution degree of the acyl group. Next, the acylated cellulose was ripened at 40° C. The degree of polymerization of the thus-obtained cellulose acylate was obtained according to the method mentioned below, and this is shown in Table 1.

[Method of Measuring Degree of Polymerization]

About 2.0 g of the absolutely-dried cellulose acylate was accurately weighed, and dissolved in 100 ml of a mixed solvent of methylene chloride/ethanol=9/1 (by mass). Using an Ostwaid viscometer, this was analyzed in point of the time (seconds) it took before it dripped at 25° C., and the degree of polymerization of the sample was obtained according to the following formulae:

$$\eta Rel = T/T_0$$

$$[\eta] = (\ln \eta Rel)/C$$

$$DP = [\eta]/Km,$$

wherein,

T indicates the time (seconds) taken by the sample before it dripped, $T_0$ indicates the time (seconds) taken by the solvent alone before it dropped, C indicates the sample concentration (g/liter), Km is $6 \times 10^{-4}$.

Tg of the cellulose acylates having a different acyl group and a different substitution degree in Table 1 was measured according to the method mentioned below, and shown in Table 1. The samples with plasticizer were measured after the plasticizer had been added thereto.

[Tg Measurement]

20 mg of a sample is put into a DSC pan. Next, the pan with the sample therein is heated in a nitrogen atmosphere from 30° C. to 250° C., at a heating rate of 100° C./min (first heating), and then cooled to 30° C. at a cooling rate of −100° C./min. Next, this is again heated from 30° C. to 250° C. (second heating), and its Tg (temperature at which the base line begins to shift from the low-temperature side) is measured, and shown in Table 1. Further, as in Table 1, a plasticizer (Plasticizer 2 described in JP-A-2000-352620) is added to some samples. In addition, 0.05% by mass of silicon dioxide fine particles (Aerosil R972V) are added to all samples.

(2) Melt Film Formation

The cellulose acylate was shaped into columnar pellets each having a diameter of 3 mm and a length of 5 mm, and dried in a vacuum drier at 110° C. By changing the drying time, pellets having a different water content were prepared. Using a Curl-Fisher water content meter (Hiranuma Sangyo's minor water content meter, AQ-2000, automatic water vaporizer LE-20SA), the water content of each sample heated at 150° C. was measured.

The pellets were put into a hopper that had been conditioned at a temperature of (Tg−10° C.), and melt-extruded out under the condition shown in Table 1 (temperature, compression ratio, T-die temperature), taking 10 minutes. The resulting melt was cooled and solidified on a casting drum under the condition shown in Table 1, according to a leveling electrostatic method (in which a 10 kV-wire was positioned at 10 cm from the melt-reaching point on the casting drum), and a cellulose acylate film was thus formed. In this stage, the cooled and solidified melt was peeled off, and wound up via a nip roll under the condition shown in Table 1. Just before wound up, both edges of the melt film were trimmed off (by 3% of the overall width), and they were knurled to a width of 10 nm and a height of 50 μm. Thus processed, the film was wound up. Every sample was wound up to a length of 3000 m having a width of 1.5 m, at a winding-up speed of 30 m/min.

The physical properties of the thus-obtained unstretched cellulose acylate film were measured according to the methods mentioned above, and shown in Table 2.

2. Formation of Stretched Cellulose Acylate Film

The unstretched sheet was stretched at a stretching rate of 300%/min in both the machine direction and the transverse direction, under the condition shown in Table 3. The physical properties of the thus-stretched cellulose acylate film were measured in the same manner as above, and shown in Table 3.

3. Construction of Polarizer (1) Saponification of Cellulose Acylate Film:

The unstretched cellulose acylate film was saponified according to any of the methods mentioned below, and its data are shown in Table 2.

(a) Coating Saponification:

20 parts by mass of water was added to 80 parts by weight of iso-propanol, and KOH was dissolved therein to have a concentration of 1.5 mol/liter. This was conditioned at 60° C., and used as a saponification solution. The saponification solution was applied to the cellulose acylate film at 60° C. in an amount of 10 g/m², and the film was saponified for 1 minute. Next, hot water at 50° C. was sprayed on it for 1 minute, in an amount of 10 liter/m²/min, and the film was washed with it.

(b) Dipping Saponification:

An aqueous NaOH solution of 1.5 mol/liter was used as a saponification solution. This was conditioned at 60° C., and the cellulose acylate film was dipped in it for 2 minutes. Next, this was dipped in an aqueous sulfuric acid solution of 0.05 mol/liter (0.1 N) for 30 seconds, and then led to pass through a rinsing bath.

(2) Formation of Polarizing Layer:

A polarizing layer having a thickness of 20 pin was formed according to any of the methods mentioned below.

(a) Oblique Stretching Method:

According to Example 1 in JP-A-2002-86554, a film was stretched with a tenter so that its stretching axis could be 45° in the oblique direction.

(b) Parallel Stretching Method:

According to Example 1 in JP-A-2001-141926, a film was stretched in the machine direction between two pairs of nip rolls differing in the circumferential speed.

(3) Lamination:

The thus-prepared polarizing layer was laminated with the above-mentioned, saponified, unstretched cellulose acylate film by the use of an adhesive of an aqueous 3% solution of PVA (Kuraray's PVA-117H), in such a manner that the polarization axis and the machine direction of the cellulose acylate film could meet at an angle of 45°. Of the laminated structure, the unstretched cellulose acylate film was fitted to a 20-inch VA-type liquid-crystal display device described in FIGS. 2 to 9 in JP-A-2000-154261, and this was visually evaluated. The region (%) where the display was uneven is shown in Table 2.

TABLE 1

| | Cellulose Acylate | | | | | | | | |
|---|---|---|---|---|---|---|---|---|---|
| | Degree of Substitution | | | | | | | | |
| | acetate group (X) | proplonate group (Y1) | butyrate group (Y2) | pentanoate group (Y3) | hexanoate group (Y4) | Y (total of Y1 to Y4) | X + Y | Degree of Polymerization | Tg (° C.) |
| unstretched-1 | 1 | | 1.7 | | | 1.7 | 2.7 | 300 | 136 |
| unstretched-2 | 1 | | 1.7 | | | 1.7 | 2.7 | 300 | 136 |
| unstretched-3 | 1 | | 1.7 | | | 1.7 | 2.7 | 300 | 136 |
| unstretched-4 | 0.7 | | 2.3 | | | 2.3 | 3 | 350 | 106 |
| unstretched-5 | 0.7 | | 2.3 | | | 2.3 | 3 | 350 | 106 |
| unstretched-6 | 0.7 | | 2.3 | | | 2.3 | 3 | 350 | 106 |
| unstretched-7 | 0.7 | | 2.3 | | | 2.3 | 3 | 350 | 106 |
| unstretched-8 | 0.7 | | 2.3 | | | 2.3 | 3 | 350 | 106 |
| unstretched-9 | 0.2 | 2.5 | | | | 2.5 | 2.7 | 250 | 140 |
| unstretched-10 | 0.2 | 2.5 | | | | 2.5 | 2.7 | 250 | 140 |
| unstretched-11 | 0.2 | 2.5 | | | | 2.5 | 2.7 | 250 | 140 |
| unstretched-12 | 0.2 | 2.5 | | | | 2.5 | 2.7 | 250 | 140 |
| unstretched-13 | | 3 | | | | 3 | 3 | 200 | 115 |
| unstretched-14 | | 3 | | | | 3 | 3 | 200 | 115 |
| unstretched-15 | | 3 | | | | 3 | 3 | 200 | 115 |
| unstretched-16 | | 3 | | | | 3 | 3 | 200 | 115 |
| unstretched-17 | 1.8 | | | 0.5 | 0.5 | 1 | 2.8 | 400 | 150 |
| unstretched-18 | 1.8 | | | 0.5 | 0.5 | 1 | 2.8 | 400 | 150 |
| unstretched-19 | 1.8 | | | 0.5 | 0.5 | 1 | 2.8 | 400 | 150 |
| unstretched-20 | 1.8 | | | 0.5 | 0.5 | 1 | 2.8 | 400 | 150 |
| unstretched-21 | 0.5 | 1.2 | 1.2 | | | 2.4 | 2.9 | 330 | 120 |
| unstretched-22 | 0.5 | 1.2 | 1.2 | | | 2.4 | 2.9 | 330 | 120 |
| unstretched-23 | 0.5 | 1.2 | 1.2 | | | 2.4 | 2.9 | 330 | 120 |
| unstretched-24 | 0.5 | 1.2 | 1.2 | | | 2.4 | 2.9 | 330 | 120 |
| unstretched-25 | 1 | | 1.7 | | | 1.7 | 2.7 | 300 | 80 |
| unstretched-26 | 1 | | 1.7 | | | 1.7 | 2.7 | 300 | 80 |
| unstretched-27 | 1 | | 1.7 | | | 1.7 | 2.7 | 300 | 80 |
| unstretched-28 | 1 | | 1.7 | | | 1.7 | 2.7 | 300 | 80 |
| unstretched-29 | 0.4 | 1.6 | 0.6 | | | 2.2 | 2.6 | 280 | 125 |
| unstretched-30 | 0.4 | 1.6 | 0.6 | | | 2.2 | 2.6 | 280 | 125 |
| unstretched-31 | 0.4 | 1.6 | 0.6 | | | 2.2 | 2.6 | 280 | 125 |
| unstretched-32 | 0.4 | 1.6 | 0.6 | | | 2.2 | 2.6 | 280 | 125 |
| unstretched-33 | 0.3 | | 2.6 | | | 2.6 | 2.9 | 350 | 90 |
| unstretched-34 | 0.3 | | 2.6 | | | 2.6 | 2.9 | 350 | 90 |
| unstretched-35 | 0.3 | | 2.6 | | | 2.6 | 2.9 | 350 | 90 |
| unstretched-36 | 2.1 | 0.9 | | | | 0.9 | 3 | | 180 |
| unstretched-37 | 1.9 | 1.1 | | | | 1.1 | 3 | | 135 |
| unstretched-38 | | 3 | | | | 3 | 3 | | 95 |
| unstretched-39 | 1.9 | 0.71 | | | | 0.71 | 2.6 | 300 | 145 |

| | | | Melting Condition | | | | |
|---|---|---|---|---|---|---|---|
| | Amount of Plasticizer (wt. %) | Water Content (wt. %) | Melting Temperature | | | Compression Ratio | Melting Temperature (downstream) - T-die Temperature (° C.) |
| | | | upstream (° C.) | middle (° C.) | downstream (° C.) | | |
| unstretched-1 | | 0 | 220 | 220 | 220 | 5 | −10 |
| unstretched-2 | | 0.4 | 220 | 220 | 220 | 5 | −10 |
| unstretched-3 | | 0.6 | 220 | 220 | 220 | 5 | −10 |
| unstretched-4 | | 0.1 | 170 | 170 | 170 | 7 | −15 |
| unstretched-5 | | 0.1 | 180 | 180 | 180 | 7 | −15 |
| unstretched-6 | | 0.1 | 230 | 230 | 230 | 7 | −15 |
| unstretched-7 | | 0.1 | 235 | 235 | 235 | 7 | −15 |
| unstretched-8 | | 0.1 | 260 | 260 | 260 | 7 | −15 |
| unstretched-9 | | 0.2 | 200 | 230 | 210 | 2 | −20 |
| unstretched-10 | | 0.2 | 200 | 230 | 210 | 3 | −20 |
| unstretched-11 | | 0.2 | 200 | 230 | 210 | 15 | −20 |
| unstretched-12 | | 0.2 | 200 | 230 | 210 | 16 | −20 |
| unstretched-13 | | 0.3 | 210 | 210 | 220 | 11 | 0 |
| unstretched-14 | | 0.3 | 210 | 210 | 220 | 11 | −5 |
| unstretched-15 | | 0.3 | 210 | 210 | 220 | 11 | 30 |
| unstretched-16 | | 0.3 | 210 | 210 | 220 | 11 | 35 |
| unstretched-17 | | 0 | 250 | 250 | 250 | 4 | −25 |
| unstretched-18 | | 0 | 250 | 250 | 250 | 4 | −25 |
| unstretched-19 | | 0 | 250 | 250 | 250 | 4 | −25 |
| unstretched-20 | | 0 | 250 | 250 | 250 | 4 | −25 |
| unstretched-21 | | 0.1 | 200 | 200 | 200 | 9 | −12 |
| unstretched-22 | | 0.1 | 200 | 200 | 200 | 9 | −12 |
| unstretched-23 | | 0.1 | 200 | 200 | 200 | 9 | −12 |
| unstretched-24 | | 0.1 | 200 | 200 | 200 | 9 | −12 |
| unstretched-25 | 2 | 0.2 | 180 | 180 | 180 | 14 | −7 |
| unstretched-26 | 2 | 0.2 | 180 | 180 | 180 | 14 | −7 |

TABLE 1-continued

| | | | | | | | |
|---|---|---|---|---|---|---|---|
| unstretched-27 | 2 | 0.2 | 180 | 180 | 180 | 14 | −7 |
| unstretched-28 | 2 | 0.2 | 180 | 180 | 180 | 14 | −7 |
| unstretched-29 | | 0.3 | 230 | 220 | 210 | 6 | −17 |
| unstretched-30 | | 0.3 | 230 | 220 | 210 | 6 | −17 |
| unstretched-31 | | 0.3 | 230 | 220 | 210 | 6 | −17 |
| unstretched-32 | | 0.3 | 230 | 220 | 210 | 6 | −17 |
| unstretched-33 | | 0 | 190 | 190 | 190 | 8 | −16 |
| unstretched-34 | | 0 | 190 | 190 | 190 | 8 | −16 |
| unstretched-35 | | 0 | 190 | 190 | 190 | 8 | −16 |
| unstretched-36 | | 0.1 | 240 | 240 | 240 | 7 | −22 |
| unstretched-37 | | 0.1 | 240 | 240 | 240 | 7 | −22 |
| unstretched-38 | | 0.1 | 240 | 240 | 240 | 7 | −22 |
| unstretched-39 | | | 240 | 240 | 240 | 2 | 0 |

| | Casting Condition | | | | | | |
|---|---|---|---|---|---|---|---|
| | T-die/Casting Drum Distance (cm) | Solidification Speed (° C./sec) | Casting Drum Temperature 1st roll (upstream) (° C.) | 2nd roll (upstream) (° C.) | 3rd roll (upstream) (° C.) | Cooling Speed (° C./sec) | Winding Tension (kg/cm$^2$) | Remarks |
| unstretched-1 | 10 | 40 | Tg − 10 | Tg − 7 | Tg − 15 | −5 | 3 | the invention |
| unstretched-2 | 10 | 40 | Tg − 10 | Tg − 7 | Tg − 15 | −5 | 3 | the invention |
| unstretched-3 | 10 | 40 | Tg − 10 | Tg − 7 | Tg − 15 | −5 | 3 | comparison |
| unstretched-4 | 15 | 60 | Tg − 5 | Tg − 4 | Tg − 3 | −1 | 5 | comparison |
| unstretched-5 | 15 | 60 | Tg − 5 | Tg − 4 | Tg − 3 | −1 | 5 | the invention |
| unstretched-6 | 15 | 60 | Tg − 5 | Tg − 4 | Tg − 3 | −1 | 5 | the invention |
| unstretched-7 | 15 | 60 | Tg − 5 | Tg − 4 | Tg − 3 | −1 | 5 | the invention |
| unstretched-8 | 15 | 60 | Tg − 5 | Tg − 4 | Tg − 3 | −1 | 5 | comparison |
| unstretched-9 | 25 | 80 | Tg − 5 | Tg − 7 | Tg − 9 | −3 | 8 | comparison |
| unstretched-10 | 25 | 80 | Tg − 5 | Tg − 7 | Tg − 9 | −3 | 8 | the invention |
| unstretched-11 | 25 | 80 | Tg − 5 | Tg − 7 | Tg − 9 | −3 | 8 | the invention |
| unstretched-12 | 25 | 80 | Tg − 5 | Tg − 7 | Tg − 9 | −3 | 8 | comparison |
| unstretched-13 | 20 | 50 | Tg | Tg − 15 | Tg − 30 | −18 | 7 | comparison |
| unstretched-14 | 20 | 50 | Tg | Tg − 15 | Tg − 30 | −18 | 7 | the invention |
| unstretched-15 | 20 | 50 | Tg | Tg − 15 | Tg − 30 | −18 | 7 | the invention |
| unstretched-16 | 20 | 50 | Tg | Tg − 15 | Tg − 30 | −18 | 7 | comparison |
| unstretched-17 | 3 | 90 | Tg − 3 | Tg − 10 | Tg − 6 | −14 | 4 | comparison |
| unstretched-18 | 5 | 90 | Tg − 3 | Tg − 10 | Tg − 6 | −14 | 4 | the invention |
| unstretched-19 | 45 | 90 | Tg − 3 | Tg − 10 | Tg − 6 | −14 | 4 | the invention |
| unstretched-20 | 55 | 90 | Tg − 3 | Tg − 10 | Tg − 6 | −14 | 4 | comparison |
| unstretched-21 | 18 | 8 | Tg − 10 | Tg − 12 | Tg − 14 | −7 | 1 | comparison |
| unstretched-22 | 18 | 11 | Tg − 10 | Tg − 12 | Tg − 14 | −7 | 1 | the invention |
| unstretched-23 | 18 | 90 | Tg − 10 | Tg − 12 | Tg − 14 | −7 | 1 | the invention |
| unstretched-24 | 18 | 110 | Tg − 10 | Tg − 12 | Tg − 14 | −7 | 1 | comparison |
| unstretched-25 | 8 | 30 | Tg − 40 | Tg − 41 | Tg − 42 | −17 | 6 | comparison |
| unstretched-26 | 8 | 30 | Tg − 25 | Tg − 26 | Tg − 27 | −14 | 6 | the invention |
| unstretched-27 | 8 | 30 | Tg − 1 | Tg − 2 | Tg − 3 | −7 | 6 | the invention |
| unstretched-28 | 8 | 30 | Tg + 5 | Tg + 4 | Tg + 3 | −11 | 6 | comparison |
| unstretched-29 | 30 | 70 | Tg − 3 | Tg − 2 | Tg − 1 | −0.05 | 8 | comparison |
| unstretched-30 | 30 | 70 | Tg − 3 | Tg − 3 | Tg − 3 | −0.15 | 8 | the invention |
| unstretched-31 | 30 | 70 | Tg − 3 | Tg − 15 | Tg − 30 | 18 | 8 | the invention |
| unstretched-32 | 30 | 70 | Tg − 3 | Tg − 20 | Tg − 35 | 22 | 8 | comparison |
| unstretched-33 | 5 | 75 | Tg − 8 | Tg − 10 | Tg − 12 | −16 | 0.1 | the invention |
| unstretched-34 | 5 | 75 | Tg − 8 | Tg − 10 | Tg − 12 | −16 | 9 | the invention |
| unstretched-35 | 5 | 75 | Tg − 8 | Tg − 10 | Tg − 12 | −16 | 11 | comparison |
| unstretched-36 | 45 | 65 | Tg − 12 | Tg − 15 | Tg − 18 | −10 | 2 | the invention |
| unstretched-37 | 45 | 65 | Tg − 12 | Tg − 15 | Tg − 18 | −10 | 2 | the invention |
| unstretched-38 | 45 | 65 | Tg − 12 | Tg − 15 | Tg − 18 | −10 | 2 | the invention |
| unstretched-39 | 1 | 200 | Tg − 80 | — | — | −60 | 20 | comparison |

TABLE 2

| | Re | | Rth | | Thickness | | | Humidity-Dependent Change | |
|---|---|---|---|---|---|---|---|---|---|
| | | | | | | unevenness | | | |
| | average (nm) | unevenness (%) | average (nm) | unevenness (%) | average (nm) | MD (%) | TD (%) | Re (%/% RH) | Rth (%/% RH) |
| unstretched-1 | 5 | 1 | 8 | 1 | 70 | 0.1 | 0.2 | 0.3 | 0.4 |
| unstretched-2 | 6 | 3 | 7 | 1 | 70 | 1.8 | 0.2 | 0.3 | 0.3 |
| unstretched-3 | 8 | 2 | 8 | 3 | 70 | 3.3 | 0.4 | 0.7 | 0.4 |
| unstretched-4 | 10 | 2 | 12 | 4 | 90 | 2.7 | 0.4 | 0.8 | 0.5 |
| unstretched-5 | 11 | 2 | 11 | 1 | 90 | 1.8 | 0.1 | 0.2 | 0.2 |
| unstretched-6 | 12 | 3 | 10 | 1 | 90 | 0.1 | 0.1 | 0.1 | 0 |

TABLE 2-continued

| | Re | | Rth | | Thickness unevenness | | | Humidity-Dependent Change | |
|---|---|---|---|---|---|---|---|---|---|
| | average (nm) | unevenness (%) | average (nm) | unevenness (%) | average (nm) | MD (%) | TD (%) | Re (%/% RH) | Rth (%/% RH) |
| unstretched-7 | 9 | 2 | 12 | 4 | 90 | 1.6 | 0.5 | 0.6 | 0.6 |
| unstretched-8 | 10 | 1 | 11 | 5 | 90 | 3.3 | 0.9 | 0.9 | 0.9 |
| unstretched-9 | 20 | 1 | 5 | 2 | 110 | 2.5 | 0.2 | 0.3 | 0.3 |
| unstretched-10 | 21 | 2 | 4 | 1 | 110 | 0.5 | 0.1 | 0.1 | 0.1 |
| unstretched-11 | 18 | 2 | 5 | 1 | 110 | 1.2 | 0.1 | 0 | 0.1 |
| unstretched-12 | 22 | 1 | 6 | 2 | 110 | 2.9 | 0.7 | 0.7 | 0.5 |
| unstretched-13 | 15 | 2 | 15 | 3 | 50 | 3.8 | 0.3 | 0.5 | 0.5 |
| unstretched-14 | 14 | 3 | 14 | 2 | 50 | 1.4 | 0.2 | 0.3 | 0.2 |
| unstretched-15 | 12 | 2 | 16 | 1 | 50 | 0.3 | 0.2 | 0.2 | 0.2 |
| unstretched-16 | 17 | 1 | 14 | 2 | 50 | 2.9 | 0.7 | 0.8 | 0.5 |
| unstretched-17 | 90 | 2 | 55 | 3 | 380 | 0.3 | 3.9 | 0.3 | 0.6 |
| unstretched-18 | 80 | 1 | 57 | 1 | 380 | 0.1 | 1.7 | 0.1 | 0.1 |
| unstretched-19 | 97 | 1 | 53 | 1 | 380 | 0.1 | 0.3 | 0.2 | 0.1 |
| unstretched-20 | 88 | 2 | 56 | 2 | 380 | 0.2 | 2.9 | 0.6 | 0.7 |
| unstretched-21 | 33 | 3 | 70 | 15 | 180 | 0.2 | 0.4 | 0.5 | 0.2 |
| unstretched-22 | 32 | 1 | 71 | 8 | 180 | 0.1 | 0.1 | 0.1 | 0.1 |
| unstretched-23 | 29 | 1 | 74 | 9 | 180 | 0.1 | 0.1 | 0.1 | 0.1 |
| unstretched-24 | 34 | 2 | 65 | 28 | 180 | 0.2 | 0.3 | 0.5 | 0.4 |
| unstretched-25 | 65 | 2 | 90 | 3 | 280 | 0.4 | 2.7 | 0.7 | 0.5 |
| unstretched-26 | 66 | 1 | 93 | 2 | 280 | 0.1 | 0.6 | 0.1 | 0.1 |
| unstretched-27 | 61 | 1 | 90 | 1 | 280 | 0.2 | 0.9 | 0.2 | 0.2 |
| unstretched-28 | 70 | 4 | 88 | 3 | 280 | 0.8 | 2.9 | 0.4 | 0.4 |
| unstretched-29 | 25 | 1 | 30 | 2 | 100 | 0.2 | 0.4 | 3.8 | 4.1 |
| unstretched-30 | 22 | 2 | 31 | 1 | 100 | 0.1 | 0.2 | 1.2 | 1.1 |
| unstretched-31 | 28 | 2 | 32 | 1 | 100 | 0.2 | 0.2 | 0.8 | 0.9 |
| unstretched-32 | 19 | 3 | 33 | 2 | 100 | 0.8 | 0.6 | 3.1 | 3.7 |
| unstretched-33 | 45 | 0 | 35 | 2 | 150 | 0.3 | 0.4 | 0.2 | 0.1 |
| unstretched-34 | 65 | 9 | 38 | 2 | 150 | 0.2 | 0.2 | 0.3 | 0.1 |
| unstretched-35 | 75 | 21 | 37 | 1 | 150 | 0.5 | 0.2 | 0.6 | 0.8 |
| unstretched-36 | 20 | 2 | 15 | 4 | 40 | 0.4 | 0.6 | 1.4 | 1.4 |
| unstretched-37 | 19 | 1 | 12 | 2 | 40 | 0.3 | 0.1 | 0.3 | 0.3 |
| unstretched-38 | 17 | 1 | 16 | 1 | 40 | 0.1 | 0.2 | 0.2 | 0.4 |
| unstretched-39 | 15 | 25 | 35 | 35 | 80 | 7 | 8 | 3.5 | 4.5 |

As in Table 2, when the unstretched cellulose acylate film of which the Re unevenness, the Rth unevenness, the thickness unevenness, and the humidity-dependent Re and Rth change all fall within the scope of the invention was built in a polarizer, then the display unevenness was extremely small. As opposed to this, when a film of which the Re unevenness, the Rth unevenness, the thickness unevenness, and the humidity-dependent Re and Rth change all fall outside the scope of the invention was built in a polarizer, then the optical properties were bad and the display unevenness was large in particular, the unstretched film-39 produced according to the sample No. 3-1 in Example in JP-A-2000-3526620 gave significant display unevenness.

From these, it is understood that the polarizer that comprises the unstretched cellulose acylate film is free from a problem of display unevenness.

Example 2

Using unstretched and stretched cellulose acylate films of the invention, optically-compensatory films were constructed, and these were evaluated in point of the presence or absence of display unevenness.

1. Unstretched Cellulose Acylate Film

The unstretched cellulose acylate film produced in example 1 was fitted to the first transparent support in Example 1 in JP-A-11-316378 to construct an optically-compensatory film, and this was evaluated. The optically-compensatory films comprising the unstretched cellulose acylate film of the invention shown in Table 2 were good.

2. Stretched Cellulose Acylate Film

An optically-compensatory film A was constructed in the same manner as in Example 1 in JP-A-11-316378, for which, however, the stretched cellulose acylate film of the invention was used in place of the liquid-crystal layer-coated cellulose acetate film therein.

TABLE 3

| | Unstretched Film (given in Table 1) | Stretching Temperature | | Draw Ratio in stretching | | Re | |
|---|---|---|---|---|---|---|---|
| | | center | temperature difference (edges/center) | machine direction (MD) | transverse direction (TD) | average (nm) | unevenness (%) |
| stretched-1 | unstretched-1 | Tg + 10 | 10 | 100 | 20 | 500 | 1 |
| stretched-2 | unstretched-2 | Tg + 10 | 10 | 100 | 20 | 505 | 2 |

TABLE 3-continued

|  |  |  |  |  |  |  |  |
|---|---|---|---|---|---|---|---|
| stretched-3 | unstretched-3 | Tg + 10 | 10 | 100 | 20 | 495 | 3 |
| stretched-4 | unstretched-4 | Tg + 5 | 8 | 10 | 180 | 700 | 3 |
| stretched-5 | unstretched-5 | Tg + 5 | 8 | 10 | 180 | 985 | 3 |
| stretched-6 | unstretched-6 | Tg + 5 | 8 | 10 | 180 | 695 | 3 |
| stretched-7 | unstretched-7 | Tg + 5 | 8 | 10 | 180 | 710 | 3 |
| stretched-8 | unstretched-8 | Tg + 5 | 8 | 10 | 180 | 720 | 5 |
| stretched-9 | unstretched-9 | Tg + 3 | 7 | 20 | 40 | 100 | 5 |
| stretched-10 | unstretched-10 | Tg + 3 | 7 | 20 | 40 | 105 | 2 |
| stretched-11 | unstretched-11 | Tg + 3 | 7 | 20 | 40 | 110 | 2 |
| stretched-12 | unstretched-12 | Tg + 3 | 7 | 20 | 40 | 95 | 5 |
| stretched-13 | unstretched-13 | Tg + 15 | 10 | 2 | 2 | 25 | 5 |
| stretched-14 | unstretched-14 | Tg + 15 | 10 | 2 | 2 | 22 | 2 |
| stretched-15 | unstretched-15 | Tg + 15 | 10 | 2 | 2 | 23 | 2 |
| stretched-16 | unstretched-16 | Tg + 15 | 10 | 2 | 2 | 22 | 5 |
| stretched-17 | unstretched-17 | Tg | 6 | 3 | 5 | 135 | 5 |
| stretched-18 | unstretched-18 | Tg | 6 | 3 | 5 | 137 | 1 |
| stretched-19 | unstretched-19 | Tg | 6 | 3 | 5 | 133 | 1 |
| stretched-20 | unstretched-20 | Tg | 6 | 3 | 5 | 136 | 5 |
| stretched-21 | unstretched-21 | Tg + 20 | 15 | 0 | 300 | 860 | 4 |
| stretched-22 | unstretched-22 | Tg + 20 | 15 | 0 | 300 | 865 | 2 |
| stretched-23 | unstretched-23 | Tg + 20 | 15 | 0 | 300 | 850 | 2 |
| stretched-24 | unstretched-24 | Tg + 20 | 15 | 0 | 300 | 845 | 5 |
| stretched-25 | unstretched-25 | Tg + 30 | 30 | 200 | 200 | 660 | 3 |
| stretched-26 | unstretched-26 | Tg + 30 | 30 | 200 | 200 | 665 | 1 |
| stretched-27 | unstretched-27 | Tg + 30 | 30 | 200 | 200 | 670 | 1 |
| stretched-28 | unstretched-28 | Tg + 30 | 30 | 200 | 200 | 645 | 4 |
| stretched-29 | unstretched-29 | Tg + 50 | 40 | 450 | 0 | 900 | 3 |
| stretched-30 | unstretched-30 | Tg + 50 | 40 | 450 | 0 | 920 | 2 |
| stretched-31 | unstretched-31 | Tg + 50 | 40 | 450 | 0 | 915 | 2 |
| stretched-32 | unstretched-32 | Tg + 50 | 40 | 450 | 0 | 905 | 4 |
| stretched-33 | unstretched-33 | Tg + 8 | 12 | 50 | 30 | 85 | 0 |
| stretched-34 | unstretched-34 | Tg + 8 | 12 | 50 | 30 | 84 | 8 |
| stretched-35 | unstretched-35 | Tg + 8 | 12 | 50 | 30 | 83 | 28 |
| stretched-36 | unstretched-36 | Tg + 25 | 20 | 180 | 0 | 450 | 3 |
| stretched-37 | unstretched-37 | Tg + 25 | 20 | 180 | 0 | 445 | 2 |
| stretched-38 | unstretched-38 | Tg + 25 | 20 | 180 | 0 | 465 | 2 |
| stretched-39 | unstretched-39 | Tg + 15 | 0 | 50 | 50 | 35 | 45 |
| stretched-40 | unstretched-1 | Tg + 10 | 4 | 150 | 30 | 450 | 9 |
| stretched-41 | unstretched-1 | Tg + 10 | 7 | 150 | 30 | 455 | 2 |
| stretched-42 | unstretched-1 | Tg + 10 | 38 | 150 | 30 | 435 | 2 |
| stretched-43 | unstretched-1 | Tg + 10 | 42 | 150 | 30 | 445 | 8 |

|  | Rth | | Thickness | unevenness | | Humidity-Dependent Change | |
|---|---|---|---|---|---|---|---|
|  | average (nm) | unevenness (%) | average (μm) | MD (%) | TD (%) | Re (%/% RH) | Rth (%/% RH) |
| stretched-1 | 350 | 2 | 45 | 0.2 | 0.3 | 0.4 | 0.5 |
| stretched-2 | 345 | 2 | 44 | 1.8 | 0.3 | 0.4 | 0.3 |
| stretched-3 | 355 | 5 | 46 | 3.5 | 0.5 | 0.6 | 0.4 |
| stretched-4 | 400 | 5 | 84 | 3.1 | 0.8 | 0.9 | 0.6 |
| stretched-5 | 420 | 2 | 85 | 1.7 | 0.2 | 0.3 | 0.1 |
| stretched-6 | 410 | 2 | 83 | 0.1 | 0.2 | 0.2 | 0.1 |
| stretched-7 | 395 | 5 | 85 | 1.4 | 0.4 | 0.7 | 0.7 |
| stretched-8 | 405 | 7 | 82 | 3.1 | 1.1 | 1 | 1 |
| stretched-9 | 80 | 2 | 98 | 2.6 | 0.3 | 0.3 | 0.6 |
| stretched-10 | 82 | 1 | 97 | 0.3 | 0.2 | 0.2 | 0.1 |
| stretched-11 | 78 | 1 | 100 | 1.4 | 0.2 | 0.1 | 0.2 |
| stretched-12 | 77 | 2 | 98 | 3.1 | 0.8 | 0.8 | 0.6 |
| stretched-13 | 22 | 4 | 47 | 3.9 | 0.2 | 0.4 | 0.7 |
| stretched-14 | 23 | 2 | 48 | 1.2 | 0.1 | 0.2 | 0.3 |
| stretched-15 | 20 | 2 | 50 | 0.5 | 1.1 | 0.2 | 0.2 |
| stretched-16 | 19 | 4 | 49 | 3.1 | 0.9 | 0.7 | 0.6 |
| stretched-17 | 87 | 3 | 363 | 0.3 | 4.3 | 0.4 | 0.7 |
| stretched-18 | 85 | 1 | 360 | 0.2 | 1.8 | 0 | 0.1 |
| stretched-19 | 83 | 1 | 368 | 0.1 | 0.4 | 0.1 | 0.2 |
| stretched-20 | 84 | 3 | 355 | 0.3 | 3.3 | 0.5 | 0.8 |
| stretched-21 | 430 | 19 | 120 | 0.3 | 0.6 | 0.4 | 0.4 |
| stretched-22 | 420 | 8 | 115 | 0.2 | 0.2 | 0 | 0.1 |
| stretched-23 | 415 | 8 | 125 | 0.2 | 0.1 | 0.1 | 0.2 |
| stretched-24 | 420 | 29 | 128 | 0.4 | 0.4 | 0.4 | 0.6 |
| stretched-25 | 660 | 4 | 180 | 0.5 | 2.9 | 0.6 | 0.7 |
| stretched-26 | 640 | 2 | 175 | 0.2 | 0.8 | 0 | 0.1 |
| stretched-27 | 650 | 2 | 179 | 0.2 | 0.9 | 0.2 | 0.1 |
| atretched-28 | 665 | 4 | 182 | 0.9 | 3.3 | 0.5 | 0.5 |
| stretched-29 | 450 | 3 | 71 | 0.3 | 0.5 | 3.7 | 4.3 |
| stretched-30 | 455 | 1 | 73 | 0.2 | 0.2 | 1 | 0.9 |
| stretched-31 | 440 | 1 | 75 | 0.3 | 0.3 | 0.7 | 0.7 |

TABLE 3-continued

| | | | | | | | |
|---|---|---|---|---|---|---|---|
| stretched-32 | 435 | 3 | 69 | 0.9 | 0.7 | 3.3 | 3.5 |
| stretched-33 | 67 | 3 | 120 | 0.4 | 0.5 | 0.3 | 0.3 |
| stretched-34 | 65 | 1 | 122 | 0.1 | 0.2 | 0.2 | 0.1 |
| stretched-35 | 88 | 4 | 118 | 0.6 | 0.2 | 0.8 | 0.9 |
| stretched-36 | 225 | 5 | 33 | 0.5 | 0.7 | 1.4 | 1.3 |
| stretched-37 | 230 | 1 | 31 | 0.3 | 0.2 | 0.3 | 0.4 |
| stretched-38 | 210 | 2 | 35 | 0.2 | 0.2 | 0.3 | 0.3 |
| stretched-39 | 360 | 66 | 65 | 28 | 15 | 7.5 | 9.3 |
| stretched-40 | 350 | 9 | 41 | 0.6 | 0.5 | 0.9 | 1.2 |
| stretched-41 | 340 | 1 | 43 | 0.3 | 0.1 | 0.3 | 0.4 |
| stretched-42 | 355 | 1 | 42 | 0.3 | 0.1 | 0.3 | 0.4 |
| stretched-43 | 335 | 7 | 44 | 0.7 | 0.6 | 1 | 1.2 |

As in able 3, the optically-compensatory films comprising the stretched cellulose acylate film of the invention were good.

Similarly, an optically-compensatory film B was constructed in the same manner as in Example 1 in JP-A-7-333433, for which, however, the stretched cellulose acylate film of the invention was used in place of the liquid-crystal layer-coated cellulose acetate film therein. As in Table 3, the optically-compensatory films comprising the stretched cellulose acylate film of the invention were good.

As opposed to these, the films not falling within the scope of the invention all had poor optical properties and gave significant display unevenness. In particular, the optical properties of the stretched film-39 produced according to the sample No. 3-1 in Example in JP-A-2000-3526620 greatly worsened.

Example 3

Production and Evaluation of Low-Reflection Film

According to Example 47 in Hatsumei Kyokai Kokai Giho (Kogi No. 2001-1745) and using the stretched and unstretched cellulose acylate films of the invention, low-reflection films were produced. Thus obtained, the low-reflection films had good optical properties.

Example 4

Construction and Evaluation of Liquid-Crystal Display Device

The above-mentioned polarizer of the invention was used in the liquid-crystal display device described in Example 1 in JP-A-10-48420; for the discotic liquid-crystalline molecules-containing optically-anisotropic layer and the polyvinyl alcohol-coated orientation film described in Example 1 in JP-A-9-26572; in the 20-inch VA-type liquid-crystal display device described in FIGS. 2 to 9 in JP-A-2000-154261; and in the 20-inch OCB-type liquid-crystal display device described in FIGS. 10 to 15 in JP-A-2000-154261. In addition, the low-reflection film of the invention is attached to the outermost layer of these liquid-crystal display devices, and evaluated as follows:

[Evaluation Method]

In an atmosphere at 25° C. and at a varying humidity of from 10% RH % to 80% RH, the liquid-crystal display devices were visually evaluated in point of the presence or absence of image display unevenness. In the liquid-crystal display device that showed the largest degree of display unevenness of all these devices, the region where the display unevenness occurred is shown in terms of percentage.

As in Tables 2 and 3, the samples of the invention all had good visibility.

As described in detail hereinabove with reference to its embodiments, the cellulose acylate film of the invention is free from a problem of display unevenness when used in display devices. Therefore, the film of the invention is extremely useful as a polarizer to be built in liquid-crystal display devices, especially in large-size liquid-crystal display devices, and also as an optically-compensatory film and an antireflection film for liquid-crystal displays.

The present disclosure relates to the subject matter contained in Japanese Patent Application No. 423050/2003 filed on Dec. 19, 2003, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A cellulose acylate film which is produced according to a melt casting process and which satisfies each of the following conditions (1) to (4):

(1) an Re unevenness of the cellulose acylate film is from 0 to 10%, (2) an Rth unevenness of the cellulose acylate film is from 0 to 10%, (3) a thickness unevenness of the cellulose acylate film is from 0 to 2%, and (4) its humidity-dependent Re change and humidity-dependent Rth change are from 0 to 1.5%/% RH, wherein each of the Re unevenness, Rth unevenness and thickness unevenness represents the difference between the maximum value and the minimum value of 100 machine direction samples and 50 transverse direction samples divided by the mean value thereof, represented as a percentage, wherein the melt casting process comprises extruding a melt from a melt kneader through a casting die thereof onto a casting drum, and cooling and solidifying the melt to form a film, and wherein the melt is extruded out through the casting die at a temperature not lower than its Tg.

2. The cellulose acylate film as claimed in claim 1, wherein the acylate group of cellulose acylate in the cellulose acylate film satisfies all the following conditions:

$2.6 \leq X+Y \leq 3.0$,
$0 \leq X \leq 1.8$,
$1.0 \leq Y \leq 3.0$, wherein X indicates the degree of substitution with an acetate group in the cellulose acylate; Y indicates the sum total of the degree of substitution with a propionate group, a butyrate group, a pentanoate group and a hexanoate group in the cellulose acylate.

3. The cellulose acylate film as claimed in claim 1, wherein the viscosity-average degree of polymerization of the cellulose acylate in the cellulose acylate film is from 250 to 550.

4. The cellulose acylate film as claimed in claim 1, which is produced by a method for producing a cellulose acylate film comprising melting a cellulose acylate and casting the cellulose acylate, wherein the method comprises melting a cellulose acylate having a water content of from 0 to 0.5% by use of a screw having a compression ratio of from 3 to 15 cm, at a melt temperature between 180 and 250° C., to form a melt; casting the melt through a T-die, wherein the T-die temperature is kept at from 5 to 30° C. lower than the melt temperature, onto a casting drum provided at a distance of 5 to 50 cm from the T-die; and solidifying the melt on the casting drum by cooling the melt at a rate of from 10 to 100° C./sec within a temperature range between Tg of cellulose acylate+30° C. and Tg of cellulose acylate, and peeling a solidified film from the casting drum.

5. The cellulose acylate film as claimed in claim 1, wherein the temperature of the casting drum is from (Tg−30)° C. to Tg ° C.

6. A polarizer comprising at least one layer of the cellulose acylate film of claim 1 laminated on a polarizing layer.

7. The polarizer as claimed in claim 6, wherein the temperature of the casting drum is from (Tg−30)° C. to Tg ° C.

8. The polarizer as claimed in claim 6, wherein the absorption axis of the polarizing layer meets the stretching direction of the cellulose acylate film at an angle of 45 degrees.

9. An optically-compensatory film for liquid-crystal display panels, which comprises the cellulose acylate film of claim 1 as a substrate thereof.

10. An antireflection film which comprises the cellulose acylate film of claim 1 as a substrate thereof.

* * * * *